United States Patent Office 3,803,128
Patented Apr. 9, 1974

3,803,128
6-ACYL DERIVATIVES OF AMINO-PENICILLANIC ACID
André Furlenmeier, 119 Wettsteinallee, Basel, Switzerland; Karl Vogler, 69 Wenkenstrasse, Riehen, Switzerland; Guido Zanetti, 13 Aumattstrasse, Reinach, Switzerland; and Paul Lanz, 16 Freidorfweg, Muttenz, Switzerland
No Drawing. Continuation-in-part of abandoned application Ser. No. 160,564, July 7, 1971. This application Jan. 3, 1972, Ser. No. 215,180
Claims priority, application Switzerland, July 17, 1970, 10,904/70
Int. Cl. C07d 99/16
U.S. Cl. 260—239.1        16 Claims

ABSTRACT OF THE DISCLOSURE

Compounds represented by the following formula, a process for their preparation and novel intermediates therefor are disclosed. These compounds are useful antibiotics.

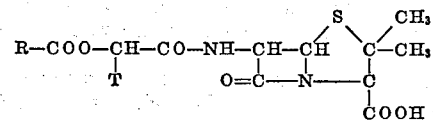

wherein R is a substituted phenyl radical and T is a $C_2$-$C_5$ alkyl or alkenyl, a cyclopropylmethyl or cyclobutylmethyl, or an aralkyl containing up to 8 carbon atoms.

RELATED APPLICATION

This application is a continuation-in-part of U.S. patent application Ser. No. 160,564, filed July 7, 1971, now abandoned.

DETAILED DESCRIPTION OF THE DISCLOSURE

The present invention is directed to novel 6-acylaminopenicillanic acid compounds represented by the general formula

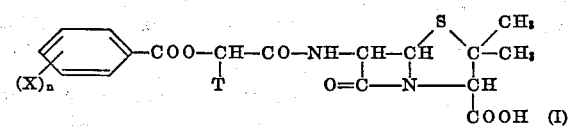

wherein X is hydrogen, halogen, $C_1$-$C_3$ alkyl, $C_1$-$C_3$ alkoxy, $C_1$-$C_3$ alkylthio, ($C_1$-$C_4$ alkanoyloxy)-methyl, ($C_1$-$C_3$ alkoxy)-methyl, $C_1$-$C_3$-alkoxy-acetamido, hydroxy-($C_1$-$C_3$ alkyl), amino-($C_1$-$C_3$ alkyl), di-($C_1$-$C_3$ alkyl)-amino, $C_1$-$C_3$ alkyl-sulfonamido, $C_1$-$C_3$ alkylsulfonyl, sulfamoyl, carbamoyl, amino, nitro, phenyl, trifluoromethyl, cyano, pyrrol-1-yl or hydroxy or two X symbols on adjacent carbon atoms together are a $C_1$-$C_3$ alkylenedioxy; n is a whole number from 1 to 3 and T is a $C_2$-$C_5$ alkyl, a $C_2$-$C_5$ alkenyl, a cyclopropylmethyl, a cyclobutylmethyl or an aralkyl containing up to 8 carbon atoms, and pharmaceutically acceptable salts and hydrated forms thereof.

The invention is also directed to the preparation of the compounds of Formula I utilizing the novel intermediate compounds represented by the formula

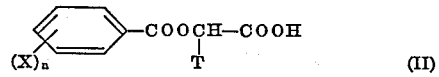

wherein X, n and T have the meanings given above and their functional derivatives.

While the term "halogen" utilized herein represents all four halogen atoms, preferred halogen substituents are fluorine, chlorine and bromine. Where X in Formulas I and II represents a fluorine atom, n preferably is 1 and where X is bromine, n preferably is 1 or 2.

In accordance with the present invention, alkyls represented by X in Formulas I and II are methyl, ethyl, n-propyl and isopropyl. In general, methyl is preferred. Alkyls or alkenyls represented by T in Formulas I and II may be straight- or branched-chain. Examples of such substituents include ethyl, n-propyl, isopropyl, n-butyl, isobutyl, n-pentyl and 3-methylbutyl, vinyl, allyl, methallyl, butenyl and pentenyl. Examples of aralkyls represented by T in Formulas I and II are benzyl and phenethyl.

Preferred compounds in accordance with the present invention are those compounds of Formulas I and II wherein n is 1 or 2 and the substituent X is in the 3- and/or 4-position. In these preferred compounds, X is selected from the group consisting of chlorine, bromine or methoxy and T is alkyl or a $C_4$-$C_5$ alkenyl, especially isobutyl or cyclopropylmethyl. Especially preferred penicillin compounds in accordance with the present invention are set forth in the following table of results of activity screening against various organisms. In the table, the antimicrobial activity of the compounds tested is expressed in terms of the minimal inhibitory concentration in mg./ml. The minimal inhibitory concentration was determined by double dilution series in nutrient bouillon.

TABLE
[Minimal Inhibitory Concentration, mg./ml.]

| | In vitro | | In vivo | |
|---|---|---|---|---|
| Compound | S. aureus FDA | E. coli 1346 | S. aureus FDA | E. coli 1346 |
| [(R)-1-(4-chlorobenzoxyloxy)-3-methylbutyl]-penicillin sodium | 0.16 | 19 | 2.3 | 31.5 |
| [(R)-1-(3,4-dichlorobenzoyloxy)-3-methylbutyl]-penicillin sodium | 0.16 | 10 | 3.0 | 48 |
| [(R,S)-1-(4-chlorobenzoyloxy)-3-methylbutyl]-penicillin sodium | 0.3 | 5 | 5 | 57 |
| [(R,S)-1-(p-fluorobenzoyloxy)-3-methylbutyl]-penicillin potassium | 0.6 | 19.5 | 25 | 47 |
| [(R.S)-1-(3-bromobenzoyloxy)-pentyl]-penicillin | 0.16 | 5 | 0.9 | 51 |
| [(R,S)-1-(2-chlorobenzoyloxy)-pentyl]-penicillin potassium | 0.16 | 10 | 1.5 | 61 |
| [(R)-1-(4-methoxymethyl-benzoyloxy)-3-methylbutyl]penicillin sodium | 0.04 | 19 | 12 | 12 |
| [(R)-1-(4-acetoxymethyl-benzoyloxy)-3-methylbutyl]-penicillin sodium | 0.04 | 19 | 6 | 18 |
| [(R)-3-methyl-1-(4-phenyl-benzoyloxy)-butyl]-penicillin sodium | 0.3 | 19.5 | 1.8 | 27 |
| [(R)-1-(p-anisoyloxy)-3-methoxy-butyl]-penicillin sodium | 0.3 | 1.25 | 3 | 47 |
| [(R)-3-methyl-1-(3,4,5-trimethoxy-benzoyloxy)-butyl]-penicillin sodium | 0.6 | 1.25 | 10.8 | 47 |
| [(R)-3-methyl-1-(p-nitrobenzoyloxy)butyl]-penicillin sodium | 0.15 | 1.25 | 2.6 | 12 |
| [(R)-3-methyl-1-(p-methylthio-benzoyloxy)-butyl]-penicillin sodium | 0.16 | 0.62 | 1.8 | 23 |

Especially preferred among the acid starting compounds of Formula II are those which give rise to the penicillin compounds listed in the above table.

In accordance with the present invention, the compounds of Formula I are prepared by condensing 6-aminopencillanic acid, the carboxyl of which is in a protected form, with the novel compounds of Formula II or a functional derivative thereof. Such functional derivatives include, for example, halides, azides, anhydrides, reactive esters such as the N-hydroxysuccinimide esters, amides such as imidazolides and the like. The acids of Formula II wherein X is a strongly basic group have such group in a protected form. After the reaction is completed, the protecting group(s) is cleaved off and, if desired, the product is converted into a salt.

Examples of methods whereby the carboxyl of 6-aminopenicillanic acid can be protected include conversion into a readily cleavable ester such as, for example, the benzyl ester, a p-bromophenacyl ester or a silyl ester such as the trimethyl silyl ester or by salt formation with an inorganic or tertiary organic base such as, for example, triethylamine. When the condensation of 6-aminopenicillanic acid and the acid of Formula II is completed, the ester protecting group can be easily removed by methods known in the art. For example, a p-bromophenacyl ester group can be cleaved by means of treatment with potassium thiophenolate, a silyl ester can readily be removed with water, as is well known in the art.

Examples of methods whereby substituents represented by X in Formula II which are more basic than, for example, $H_2N-CH_2-$, may be protected prior to the condensation reaction include formation of the o-nitrophenylsulfenyl group via the corresponding chlorides, as is known in the art. This readily cleavable protecting group can be removed after the condensation reaction by treatment with thioacetamide at a pH of 2.5 to 3 and a temperature of between $-10°$ C. and $10°$ C.

The condensation of 6-aminopenicillanic acid having a protected carboxyl and the compound of Formula II is carried out by methods well known in the art of peptide chemistry. Thus, for example, the condensation is effected in the presence of a carbodiimide such as dicyclohexylcarbodiimide or an oxazolium salt such as N-ethyl-5-phenyl-isoxazolium-3′-sulfonate in an inert solvent. Suitable solvents include, for example, ethyl acetate, acetonitrile dioxan, chloroform, methylene chloride, benzene, dimethylformamide and the like. In a like manner, a salt of a 6-aminopenicillanic acid such as, for example, a trialkylammonium salt is condensed with a reactive functional derivative of a compound of Formula II.

The compounds of Formula II may be utilized in an optically uniform form or as racemates. Insofar as they are not known or described hereinafter, such compounds can be prepared in analogy to the procedures set forth in the following examples for individual compounds. For example, an optically active or racemic compound represented by the general formula

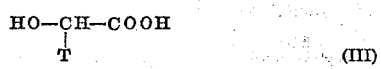
(III)

wherein T has the meaning given can be reacted with a reactive acid derivative such as, for example, an anhydride or halide, for a compound represented by the general formula

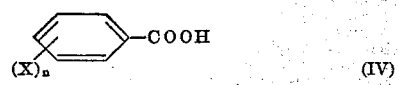
(IV)

wherein X and $n$ have the meanings given to yield a compound of Formula II.

An alternate method for the preparation of the compounds of Formula II comprises converting an optically active or racemic compound of Formula III into a readily cleavable ester such as, for example, the benzyl ester or the t-butyl ester, and reacting this ester with a reactive acid derivative of a compound of Formula IV in the presence of a base such as, for example, sodium hydrogen carbonate, pyridine, triethylamine and the like. The ester group is then removed, for example, by hydrogenolysis in the case of the benzyl ester or mild acid hydrolysis in the case of the t-butyl ester.

Another method for the preparation of the compounds of Formula II comprises reacting a readily leavable ester of an optically active or racemic compound represented by the general formula

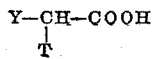
(V)

wherein Y is a halogen and T has the meaning given with an alkali metal or alkaline earth metal salt of a compound of Formula IV or with a compound of the Formula IV in the presence of a tertiary nitrogen-containing base such as, for example, triethylamine in an inert solvent. The readily cleavable protecting ester group is thereafter removed as described above.

The 6-acyl derivatives of 6-aminopenicillanic acid provided by the present invention possess a broad spectrum of activity against both Gram-positive such as *Staphylococcus aureus, Diplococcus pneumoniae* and *Streptococcus pyogenes* and Gram-negative microorganisms such as *Escherichia coli, Proteus vulgaris, Proteus mirabilis* and *Salmonella typhimurium.* Their antibiotic and bactericidal activity allows them to be utilized therapeutically and as disinfectants. It is preferred in accordance with the invention to administer the novel penicillin compounds described herein orally in view of their superior stability against gastric acid. It is contemplated in the case of adults, oral dosage forms containing 200–600 mg. are administered three or four times daily. This dosage regimen may be adjusted by the clinician as the therapeutic situation requires. The novel penicillin compounds of the invention may also be administered parenterally, rectally or topically in suitable dosage forms and may be administered in the form of their pharmaceutically acceptable salts or hydrates.

Examples of the pharmaceutically acceptable salts of the penicillin compounds of Formula I include salts with inorganic bases such as, for example, the alkali metal salts, for example, the sodium or potassium salt, ammonium salts, alkaline earth metal salts such as, for example, the calcium salt and the like and salts with organic bases such as amine compounds, for example, N-ethyl piperidine, procaine, dibenzylamine, N,N′-dibenzylethylethylenediamine, alkylamines, dialkylamines or the like. These salts can also be hydrated. The hydration can be effected during the manufacturing process or can occur gradually as a consequence of the hygroscopic properties of an initially anhydrous salt.

The compounds of Formula I and their salts can exist as optically pure isomers and as diastereomer mixtures.

For purposes of administration, the novel 16-acyl derivatives of 6-aminopenicillanic acid of the present invention can be combined with conventional compatible organic or inorganic pharmaceutical carrier materials known in the art. Such materials include, for example, water, gelatin, gums, lactose, starches, magnesium stearate, talc, vegetable oils, polyalkylene glycols, petroleum jelly and the like. Such pharmaceutical preparations may be in unit dosage form and may additionally contain other therapeutically valuable substances or conventional pharmaceutical adjuvants such as preservatives, stabilizing agents, wetting agents, emulsifying agents, buffers and the like. The pharmaceutical preparations can be in conventional solid dosage forms such as tablets, capsules, dragées and the like, conventional semisolid forms such as ointments and creams, conventional liquid forms such as solutions, suspensions, emulsions and the like and other conventional dosage forms such as dry ampules, suppositories and the like. Such preparations may be submitted to conventional pharmaceutical expedients such as, for example, sterilization and the like.

The following examples illustrate the process provided by the present invention. All temperatures are in degrees centigrade.

EXAMPLE 1

[(R)-1-(4-chlorobenzoxyloxy)-3-methylbutyl]-penicillin sodium (A) The preparation of the starting material:
19.8 g. of R-α-hydroxy-isocaproic acid were dissolved in 90 ml. of pyridine and cooled to $-15°$. A solution of 34.0 g. of p-chlorobenzoyl chloride in 50 ml. of methylene chloride was then added dropwise thereto with stirring. The reaction mixture was stirred for three hours at −10° and then allowed to stand for 20 hours at 25°. The pyridine was distilled off in a vacuum at 50°. After ice had been added, the residue was made congoacidic with 3 N hydrochloric acid and extracted with 250 ml. of ethyl acetate. The ethyl acetate phase was washed twice with 1 N hydrochloric acid and twice with water, dried with magnesium sulphate and evaporated in a vacuum at 40°. The residue was then suspended in 70 ml. of benzene, the insoluble p-chlorobenzoic acid filtered off and the filtrate evaporated in a vacuum. The resin thus obtained was dissolved in petroleum ether and the solution stored at 0° for 3 hours, filtered off from a further amount of 4-chlorobenzoic acid, evaporated in a vacuum at 40° and the residue dried. R-α-(4-chlorobenzoyloxy)-isocaproic acid was thus obtained as a viscous oil. $[\alpha]_D^{25} = +8.0°$ (c.=4.3 in alcohol).

15.7 g. of the foregoing acid were dissolved in 50 ml. of absolute benzene, treated with 10 ml. of thionyl chloride and heated to 70° for 45 minutes. The solution was then evaporated in a vacuum at 45°, the resulting syrup evaporated twice with 30 ml. portions of benzene and the R-α-(4-chlorobenzoyloxy)-isocaproic acid chloride dried in a vacuum at 45°. The acid chloride was used in this form in the process as follows.

(B) The process:

A solution of 2.9 g. of R-α-(4-chlorobenzoyloxy)-isocaproic acid chloride formed above in 15 ml. of methylene chloride was added dropwise with stirring to a solution of 2.3 g. of 6-aminopenicillanic acid in a mixture of 25 ml. of methylene chloride and 2.8 ml. of triethylamine which had been cooled to −15°. The mixture was maintained at 0° for 20 hours and then evaporated in a vacuum at 20°. The residue was dissolved in 30 ml. of ice-water and extracted twice with 15 ml. of ether. The aqueous phase was adjusted to pH 2 at 0° with 3 N sulphuric acid and extracted three times with 30 ml. portions of ether. The ether solutions were washed three times with 10 ml. portions of ice-water, dried with magnesium sulphate and evaporated in a vacuum at 20°. The [(R)-1-(4-chlorobenzoyloxy)-3-methylbutyl]-penicillin thus obtained was suspended in 20 ml. of water at 5°. The pH of the suspension was then adjusted to pH 7 with sodium bicarbonate solution and the whole filtered. The filtrate was evaporated to dryness in a vacuum at 20°. There was obtained [(R)-1-(4-chlorobenzoyloxy)-3-methtylbutyl]-penicillin sodium which was dissolved in 15 ml. of ethyl acetate. The solution was filtered and treated with 150 ml. of low-boiling petroleum ether. The precipitated sodium salt was separated off, washed with low-boiling petroleum ether, dried and recrystallized from ethyl acetate. Melting point=211° (decomposition); $[\alpha]_D^{25} = +202°$ (c.=0.5 in water).

EXAMPLE 2

[(S)-1-(4-chlorobenzoyloxy)-3-methylbutyl]-penicillin sodium (A) The preparation of the starting material:

23.5 g. of 4-chlorobenzoyl chloride were added dropwise with stirring over a period of 20 minutes to a solution of 20.0 g. of 4-chlorobenzoic acid in 160 ml. of tetrahydrofuran and 18 ml. of triethylamine which had been cooled to −30°. The mixture was stirred at −30° for 30 minutes and then a solution of 16.9 g. of (S)-α-hydroxy-isocaproic acid and 18 ml. of triethylamine in 60 ml. of tetrahydrofuran was added dropwise. The reaction mixture was then stirred at −30° for 3 hours and at 20° to 25° for 12 hours. The insoluble precipitate was separated off and the filtrate evaporated in a vacuum at 50°. The resulting syrup was dissolved in 300 ml. of ethyl acetate, made congo-acidic at 0° with 3 N hydrochloric acid and the insoluble 4-chlorobenzoic acid filtered off in a vacuum. The ethyl acetate solution was then separated off, washed three times with 40 ml. of water, dried with magnesium sulphate and evaporated in a vacuum at 40°. The residue was suspended in 40 ml. of benzene, the insoluble 4-chlorobenzoic acid separated off and the filtrate evaporated in a vacuum at 40°. The resulting syrup was dissolved in 40 ml. of low-boiling petroleum ether, maintained at 25° for 4 hours and thereafter the 4-chlorobenzoic acid which again crystallizes out was filtered off. The filtrate was evaporated and dried in a vacuum, to yield (S)-α-(4-chlorobenzoyloxy)-isocaproic acid as a viscous oil. $[\alpha]_D^{20} = 8.0°$ (c.=4.3 in alcohol).

If the R form is desired, the acid can be converted into the acid chloride as described in Example 1(A).

(B) The process:

By following the procedure described in Example 1(B), from (S)-α-(4-chlorobenzoyloxy)-isocaproic acid there was obtained [(S)-1-(4-chlorobenzoyloxy)-3-methylbutyl]-penicillin sodium; $[\alpha]_D^{25} = +160 \pm 5°$ (c.=0.5 in water).

EXAMPLE 3

[(R)-1-(3,4-dichlorobenzoyloxy)-3-methylbutyl]-penicillin sodium (A) The preparation of the starting material:

17.5 g. of 3,4-dichlorobenzoyl chloride were added dropwise over a period of 20 minutes to a cold (−15°) solution of 10.0 g. of R-α-hydroxy-isocaproic acid in 60 ml. of pyridine. The mixture was stirred at −10° for 3 hours and at 25° for 20 hours. The pyridine was distilled off in a vacuum at 50°. Ice was added and the residue made congo-acidic with 3 N hydrochloric acid and extracted with 200 ml. of ethyl acetate. The ethyl acetate phase was washed twice with 50 ml. of 1 N hydrochloric acid and twice with 50 ml. of water, dried with magnesium sulphate and evaporated in a vacuum at 40°. The residue was suspended in 150 ml. of low-boiling petroleum ether. The insoluble 3,4-dichlorobenzoic acid was filtered off, the filtrate evaporated in a vacuum at 40°, the resulting syrup dissolved in 50 ml. of low-boiling petroleum ether and maintained at −25° for 3 hours. The mixture was then filtered off from a small amount of 3,4-dichlorobenzoic acid and the filtrate evaporated in a vacuum at 40°. The oily R-α-(3,4-dichlorobenzoyloxy)-isocaproic acid was dried in a vacuum at 40° and converted into R-α-(3,4-dichlorobenzoyloxy)-isocaproic acid chloride with thionyl chloride.

(B) The process:

A solution of 3.2 g. of R-α-(3,4-dichlorobenzoyloxy)-isocaproic acid chloride formed above in 15 ml. of methylene chloride was added dropwise with stirring to a solution of 2.3 g. of 6-aminopenicillanic acid in a mixture of 25 ml. of methylene chloride and 2.8 ml. of triethylamine which had been cooled to −40°. The mixture was maintained at 0° for 20 hours. The solvent was distilled off in a vacuum at 20° and the residue dissolved in 30 ml. of ice-water. The aqueous solution was then extracted twice with 10 ml. portions of ether adjusted to pH 2 at 0° with 3 N sulfuric acid and extracted 3 times with 30 ml. portions of ether each time. The ether extracts were then washed 3 times with 15 ml. portions of ice-water, dried with magnesium sulphate and evaporated in a vacuum at 20°. The [(R)-1-(3,4-dichlorobenzoyloxy)-3-methylbutyl]-penicillin thus obtained was suspended in 30 ml. of ice-water, adjusted to pH 7 with sodium bicarbonate solution and stirred until dissolved. The solution was filtered and the filtrate evaporated in a vacuum at 20°. There was obtained [(R)-1-(3,4-dichlorobenzoyloxy)-3-methylbutyl]-penicillin sodium which was dissolved in 15 ml. of methylene chloride. The solution was filtered and treated with 150 ml. of low-boiling petroleum ether. The precipitated sodium salt was filtered off, washed with low-boiling petroleum ether and dried in a vacuum at 20°. $[\alpha]_D^{25} = +139°$ (c.=0.5 in water).

EXAMPLE 4

[(R,S)-1-(4-chlorobenzoyloxy)-propyl]-penicillin potassium (A) The preparation of the starting material:

A solution of 31.3 g. of 4-chlorobenzoic acid, 51.4 g. of R,S-α-bromobutyric acid benzyl ester and 22.3 g. of triethylamine in 400 ml. of absolute dioxan was boiled under reflux for 20 hours. After cooling, the triethylamine hydrobromide which crystallized out was filtered off by suction. The filtrate was then evaporated in a vacuum and the residue taken up in 500 ml. of ethyl acetate. The ethyl acetate solution was washed with water, ice-cold 5 percent sodium bicarbonate solution and water, dried over magnesium sulphate and evaporated in a vacuum. The residual R,S-α-(4-chlorobenzoyloxy)-butyric acid benzyl ester was distilled in a high vacuum. Boiling point 143°–145°/0.05 mm. Hg.

33 g. of R,S-α-(4-chlorobenzoyloxy)-butyric acid benzyl ester were dissolved in 700 ml. of alcohol and, with the addition of Pd/C, hydrogenated up to the uptake of the theoretical amount of hydrogen. The catalyst was separated off, the filtrate evaporated in a vacuum and the residue dissolved in 500 ml. of ethyl acetate. The ethyl acetate solution was washed with water and extracted twice with 150 ml. portions of 5 percent sodium bicarbonate solution. The alkaline solution was cooled with ice, made congo-acidic with concentrated hydrochloric acid and extracted with 450 ml. of ethyl acetate. The ethyl acetate solution was washed with water, dried over magnesium sulphate and evaporated in a vacuum. The R,S-α-(4-chlorobenzoyloxy)-butyric acid thus obtained was recrystallized from cyclohexane. Melting point 81°–82°.

(B) The process:

A solution of 12.1 g. of R,S-α-(4-chlorobenzoyloxy)-butyric acid in 100 ml. of absolute chloroform, cooled to −15° was treated with 5.1 g. of triethylamine and 6.0 g. of pivaloyl chloride and the mixture subsequently stirred at −15° for 30 minutes. A solution of 10.8 g. of 6-aminopenicillanic acid and 10.1 g. of triethylamine in 100 ml. of absolute chloroform which had been cooled to −40° was then added. The solution was stirred at −10° for 3 hours and allowed to stand at 4° for 70 hours. The solvent was then removed in a vacuum and the residue dissolved in 200 ml. of ice-water. The solution was extracted with two 100 ml. portions of ether, cooled to 2° adjusted to pH 2.1 with 1 N hydrochloric acid and then extracted with two 250 ml. portions of ethyl acetate. The ethyl acetate solution was washed with two 250 ml. portions of water, dried over magnesium sulphate, concentrated to ca. 100 ml. in a vacuum and treated with 800 ml. of low-boiling petroleum ether. The precipitated [(R,S) - 1 - (4-chlorobenzoyloxy)-propyl]-penicillin was again reprecipitated from ethyl acetate and low-boiling petroleum ether, dried and dissolved in 200 ml. of absolute ether. With stirring and ice-cooling, the solution was treated with 100 ml. of absolute ether which contained 25 ml. of a 2 M solution of potassium 2-ethyl-caproate in isopropanol. After the addition of 600 ml. of low-boiling petroleum ether, the precipitated [(R,S)-1-(4-chlorobenzoyloxy)-propyl]-penicillin potassium was filtered off by suction, washed with low-boiling petroleum ether and dried. Melting point 176°–177° (decomposition); $[\alpha]_D^{25} = +196°$ (c.=1 in water).

EXAMPLE 5

[(R,S)-1-(3-chlorobenzoyloxy)-propyl]-penicillin potassium (A) The preparation of the starting material:

A solution of 31.3 g. of 3-chlorobenzoic acid, 51.4 g. of R,S-bromobutyric acid benzyl ester and 22.3 g. of triethylamine in 400 ml. of absolute dioxan was boiled under reflux for 20 hours. After cooling, the triethylamine hydrobromine was filtered off by suction and the filtrate evaporated in a vacuum. The residue was taken up in 500 ml. of ethyl acetate. The ethyl acetate solution was washed with water, ice-cold 5 percent sodium sulphate and evaporated in a vacuum. The residual R,S-α-(3-chlorobenzoyloxy)-butyric acid benzyl ester was distilled in a high vacuum. Boiling point 143°–145°/0.01 mm. Hg.

29.6 g. of R,S-α-(3-chlorobenzoyloxy)-butyric acid benzyl ester were dissolved in 650 ml. of alcohol and, with the addition of Pd/C, hydrogenated up to the uptake of the theoretical amount of hydrogen. The catalyst was then separated off, the filtrate evaporated in a vacuum and the residue dissolved in 500 ml. of ethyl acetate. The ethyl acetate solution was washed with water and extracted twice with 150 ml. portions of a 5 percent sodium bicarbonate solution. The alkaline solution was cooled with ice, made congo-acidic with concentrated hydrochloric acid and extracted with 450 ml. of ethyl acetate. The ethyl acetate solution was washed with water, dried over magnesium sulphate and evaporated in a vacuum. The R,S-α-(3 - chlorobenzoyloxy)-butric acid thus obtained was recrystallized from cyclohexane. Melting point 80°–81°.

(B) The process:

A solution of 10.7 g. of R,S-α-(3-chlorobenzoyloxy)-butyric acid in 100 ml. of absolute chloroform, cooled to −15°, was treated with 4.5 g. of triethylamine and 5.3 g. of pivaloyl chloride and the mixture stirred at −15° for 30 minutes. A solution of 9.5 g. of 6-aminopencillanic acid and 8.9 g. of triethylamine in 100 ml. of absolute chloroform, cooled to −40°, was then added to the mixture. The solution was stirred at −10° for 3 hours and left to stand at 4° for 70 hours. The solvent was evaporated off in a vacuum and the residue dissolved in 200 ml. of ice-water. The aqueous solution was extracted with two 100 ml. portions of ether, cooled to 2°, adjusted to pH 2.1 with 1 N hydrochloric acid and extracted with two 250 ml. portions of ethyl acetate. The ethyl acetate solution was washed with two 250 ml. portions of water, dried over magnesium sulphate, concentrated to ca. 100 ml. in a vacuum and treated with 800 ml. of low-boiling petroleum ether. The precipitated [(R,S)-1-(3-chlorobenzoyloxy)-propyl]-penicillin was reprecipitated from ethyl acetate and low-boiling petroleum ether, dried and dissolved in 200 ml. of absolute ether. With stirring and ice-cooling, the solution was treated with 100 ml. of absolute ether which contained 22 ml. of a 2 M solution of potassium 2-ethyl-caproate in isopropanol. After the addition of 700 ml. of low-boiling petroleum ether, the precipitated [(R,S) - 1 - (3-chlorobenzoyloxy)-propyl]-penicillin potassium was filtered off by suction, washed with low-boiling petroleum ether and dried. Melting point 140° (decomposition); $[\alpha]_D^{25} + 161°$ (c.=1 in water).

EXAMPLE 6

[(R,S)-1-(3,4,-dichlorobenzoyloxy)-propyl]-penicillin potassium (A) The preparation of the starting material:

A solution of 38.4 g. of 3,4-dichlorobenzoic acid, 51.4 g. of R,S-α-bromobutyric acid benzyl ester and 22.3 g. of triethylamine in 400 ml. of absolute dioxane was boiled under reflux for 20 hours. After cooling, the triethylamine hydrobromide was filtered off by suction and the filtrate evaporated in a vacuum. The residue was then taken up in 500 ml. of ethyl acetate. The ethyl acetate solution was washed with water, ice-cold 5 percent sodium bicarbonate solution and water, dried over magnesium sulphate and evaporated in a vacuum. The residual R,S-α-(3,4-dichlorobenzoyloxy)-butyric acid benzyl ester was distilled in a high vacuum. Boiling point 151°–152°/0.01 mm. Hg.

32.8 g. of R,S-α-(3,4-dichlorobenzoyloxy)-butyric acid benzyl ester were dissolved in 650 ml. of alcohol and, with the addition of Pd/C, hydrogenated up to the uptake of the theoretical amount of hydrogen. The catalyst was then separated off, the filtrate evaporated in a vacuum and the residue dissolved in 500 ml. of ethyl acetate. The ethyl acetate solution was washed with water and extracted twice with 150 ml. portions of 5 percent sodium bicarbonate solution. The alkaline solution was cooled with ice, made congo-acidic with concentrated hydrochloric acid and extracted with 450 ml. of ethyl acetate. The ethyl acetate solution was washed with water, dried over magnesium sulphate and evaporated in a vacuum. The R,S-α-(3,4-dichlorobenzoyloxy)-butyric acid thus obtained is recrystallized from cyclohexane. Melting point 121°–122°.

(B) The process:

A solution of 13.9 g. of R,S-α-(3,4-dichlorobenzoyloxy)-butyric acid in 100 ml. of absolute chloroform which had been cooled to —15° was treated with 5.1 g. of triethylamine and 6.0 g. of pivaloyl chloride and the mixture is stirred at —15° for 30 minutes. A solution of 10.8 g. of 6-aminopenicillanic acid and 10.1 g. of triethylamine in 100 ml. of absolute chloroform, cooled to —40°, was then added to the mixture. The solution was stirred at —10° for 3 hours and left to stand at 4° for 70 hours. The solvent was evaporated off in a vacuum and the residue dissolved in 200 ml. of ice-water. The aqueous solution was extracted with two 100 ml. portions of ether, cooled to 2° adjusted to pH 2.0 with 1 N hydrochloric acid and extracted with two 300 ml. portions of ethyl acetate. The ethyl acetate solution was washed with two 250 ml. portions of water, dried over magnesium sulphate, concentrated to ca. 100 ml. in a vacuum and treated with 800 ml. of low-boiling petroleum ether. The precipitated [(R,S)-1-(3,4-dichlorobenzoyloxy) - propyl] - penicillin was reprecipitated from ethyl acetate and low-boiling petroleum ether, dried and dissolved in 150 ml. of absolute ether. The solution is filtered and, with stirring and ice-cooling, treated with 100 ml. of absolute ether which contained 25 ml. of a 2 M solution of potassium 2-ethylcaproate in isopropanol. After the addition of 700 ml. of low-boiling petroleum ether, the precipitated [(R,S)-1-(3,4-dichlorobenzoyloxy)-propyl] - penicillin potassium was filtered off by suction, washed with low-boiling petroleum ether and dried. Melting point 180° (decomposition); $[\alpha]_D^{25}$ +155° (c.=1 in water).

EXAMPLE 7

[(R,S)-1-(4-chlorobenzoyloxy)-3-methylbutyl]-penicillin sodium (A) The preparation of the starting material:

100.0 g. of R,S-α-bromo-isocaproic acid, 75 ml. of benzyl alcohol, 1.0 g. of p-toluenesulphonic acid hydrate and 600 ml. of absolute toluene were boiled under reflux for 6 hours under a water-separator. The cooled solution was washed with potassium bicarbonate solution and with water, dried over magnesium sulphate and evaporated in a water-jet vacuum. In order to remove excess benzyl alcohol, the residue was distilled for a further 1 hour in a rotary evaporator at 0.1 torr and 70° bath-temperature under a CO₂/acetone condenser. There was obtained 145 g. of R,S-α-bromo-isocaproic acid benzyl ester $(n_D^{25}=1.5132)$ which was not distillable at 0.1 torr and 70°. The benzyl ester is processed without further purification.

The 145 g. of R,S-α-bromo-isocaproic acid benzyl ester thus obtained in 1 litre of dimethylformamide were treated portionwise with stirring and gassing with nitrogen with 126.0 g. of the sodium salt of 4-chlorobenzoic acid and the mixture subsequently heated to 120° with stirring for 2 hours. After cooling, the mixture was poured on to an ice-water mixture and extracted with high-boiling petroleum ether. The petroleum ether phases were washed with water, dilute sodium bicarbonate solution and water, dried over magnesium sulphate, strongly concentrated in a vacuum and dried at 0.1 torr at 60°. There was obtained 174 g. of crude R,S - α - (4-chlorobenzoyloxy)-isocaproic acid benzyl ester.

The 174 g. of crude R,S-α-(4-chlorobenzoyloxy)-isocaproic acid benzyl ester thus obtained were, after the addition of 3.0 g. of 5% palladium-charcoal, hydrogenated in 800 ml. of absolute alcohol. After the uptake of 10.1 litres of hydrogen, the catalyst was filtered off and the filtrate evaporated in a vacuum. The residue was dissolved with heating in 300 ml. of high-boiling petroleum ether, filtered and crystallized at 0°. There was obtained 107 g. of R,S-α-(4-chlorobenzoyloxy)-isocaproic acid of melting point 97°–98°.

15 g. of the R,S-α-(4-chlorobenzoyloxy)-isocaproic acid thus obtained were heated in 45 ml. of benzene for 3 hours with 12 ml. of thionyl chloride, evaporated, evaporated three times with 30 ml. portions of benzene in a vacuum at 35° and dried. There was obtained 16 g. of R,S-α-(4 - chlorobenzoyloxy) - isocaproic acid chloride which is used in the process in crude form.

(B) The process:

In analogy to the procedure described in Example 1(B), from 6-aminopencillanic acid and R,S-α-(4-chlorobenzoyloxy)-isocaproic acid there was obtained [(R,S)-1-(4-chlorobenzoyloxy)-3 - methylbutyl] - pencillin sodium; $[\alpha]_D^{25}$=+162.5° (c.=0.5 in water).

EXAMPLE 8

[(R,S)-1-(benzoyloxy)-propyl]-penicillin potassium (A) The preparation of the starting material:

A solution of 12.2 g. of benzoic acid, 25.7 g. of R,S-α-bromobutyric acid benzyl ester and 1.1 g. of triethylamine in 200 ml. of absolute dioxan was boiled under reflux for 20 hours. After cooling, the triethylamine hydrobromide was filtered off by suction and the filtrate evaporated in a vacuum. The residue was then taken up in 300 ml. of ethyl acetate. The ethyl acetate solution was washed with water, ice-cold 5 percent sodium bicarbonate solution and water, dried over magnesium sulphate and evaporated in a vacuum. The residual R,S-α-benzyloxy-butyric acid benzyl ester was distilled in a high vacuum. Boiling point 120°–122°/0.01 mm. Hg.

14.8 g. of the R,S-α-benzoyloxy-butyric acid benzyl ester obtained above were dissolved in 300 ml. of alcohol and, with the addition of Pd/C, hydrogenated up to the uptake of the theoretical amount of hydrogen. The catalyst was separated off, the filtrate evaporated in a vacuum and the residue dissolved in 300 ml. of ethyl acetate. The ethyl acetate solution was washed with water and extracted twice with 100 ml. portions of a 5 percent sodium bicarbonate solution. The alkaline solution was cooled with ice, made congo-acidic with 3 N hydrochloride acid and extracted with 300 ml. of ethyl acetate. The ethyl acetate solution was washed with water, dried over magnesium sulphate and evaporated in a vacuum. The R,S-α-benzoyloxybutyric acid thus obtained was recrystallized from ethyl acetate/low-boiling petroleum ether. Melting point 85°–86°.

(B) The process:

A solution of 10.4 g. of R,S-α-benzoyloxy-butyric acid in 100 ml. of absolute chloroform which had been cooled to —15° was treated with 5.1 g. of triethylamine and 6.0 g. of pivaloyl chloride and stirred at —15° for 30 minutes. A solution of 10.8 g. of 6-aminopenicillanic acid and 10.1 g. of triethylamine in 100 ml. of absolute chloroform which had been cooled to —40° was then added. The solution was stirred at —10° for 3 hours and left to stand at 4° for 48 hours. The solvent was evaporated off in vacuo and the residue dissolved in 200 ml. of ice-water. The aqueous solution was extracted with two 100 ml. portions of ether, cooled to 2°, adjusted to pH 2.5 with 1 N hydrochloric acid and extracted with two 250 ml. portions of ethyl acetate. The ethyl acetate solution was washed with two 250 ml. portions of water, dried over magnesium sulphate, concentrated to ca. 100 ml. in a vacuum and treated with 800 ml. of low-boiling petroleum ether. The precipitated [(R,S)-1-benzoyloxy-propyl]-penicillin was reprecipitated from ethyl acetate and low-boiling petroleum ether, dried and dissolved in 100 ml. of absolute ether. The solution was filtered and, with stirring and ice-cooling, treated with 100 ml. of absolute ether which contained 25 ml. of a 2 M solution of potassium 2-ethylcaproate in isopropanol. After the addition of 700 ml. of low-boiling petroleum ether, the precipitated [(R,S)-1-benzoyloxy - propyl] - penicillin potassium was filtered off by suction, washed with low-boiling petroleum ether, dried and recrystallized from water/alcohol. Melting point 188° (decomposition); $[\alpha]_D^{25}$ +230° (c.=1.06 in water).

EXAMPLE 9

[(R)-1-(4-chlorobenzoyloxy)-phenethyl]-penicillin potassium (A) The preparation of the starting material:

18.8 g. of R-2-hydroxy-3-phenylpropionic acid benzyl ester were dissolved in 150 ml. of of pyridine, the solution cooled to 0° and treated with 13.0 g. of p-chlorobenzoyl chloride. After 1 hour, 20 ml. of methanol were added, the mixture allowed to stand for 15 minutes and diluted with ether. With ice-cooling, the mixture was successively washed with dilute hydrochloric acid, water and dilute sodium bicarbonate solution. The solution was then dried over sodium sulphate and concentrated.

The oily residue was hydrogenated in 200 ml. of alcohol with the addition of 1 g. of 5% palladium-charcoal catalyst. After the hydrogen uptake was complete, the mixture was filtered and concentrated. The residue was taken up in ether and the acid extracted with dilute soda solution. After acidification with dilute hydrochloric acid, the mixture was shaken out with ether, the ethereal solution washed with water, dried over sodium sulphate and concentrated. The residue was crystallized from cyclohexane. The resulting R-2-(4-chlorobenzoyloxy)-3-phenylpropionic acid melted at 139°–140°; $[\alpha]_D^{25}$+69.2° (c.=3.5 in alcohol).

(B) The process:

3.04 g. of R-2-(4-chlorobenzoyloxy)-3-phenylpropionic acid produced above were heated at reflux for 2 hours in 10 ml. of thionyl chloride. The mixture was subsequently concentrated to dryness and the residue subjected twice to an azeotropic distillation with benzene. The residual oil (3.4 g.) was dissolved in 20 ml. of methylene chloride and added at 0° with stirring to a solution of 2.16 g. of 6-aminopenicillanic acid in 30 ml. of methylene chloride and 2.8 ml. of triethylamine. After 2.5 hours, the mixture was concentrated in a vacuum at 30°. The residue was dissolved in water, the solution adjusted to pH 8 with potassium bicarbonate and washed with ether. After acidification to pH 2.2 with 3 N hydrochloric acid, the penicillin product was extracted with ethyl acetate. After drying over sodium sulphate, the solution was concentrated in vacuum at 3°.

The oily residue (5.2 g.) was dissolved in a little isopropanol and treated with 5 ml. of a 2 N solution of potassium 2-ethyl-caproate in ethyl acetate. [(R)-1-(4-chlorobenzoyloxy)-phenethyl]-penicillin potassium was precipitated by the addition of isopropyl ether. Melting point 145° (decomposition); $[\alpha]_D^{25}$ +140.8° (c.=1.0 in alcohol).

EXAMPLE 10

[(R,S)-1-(p-fluorobenzoyloxy)-3-methylbutyl] penicillin potassium (A) The preparation of the starting material:

26.4 g. of R,S-α-hydroxyisocaproic acid was dissolved in 180.0 ml. of absolute dioxane in a three-necked vessel equipped with a stirrer, thermometer and reflux condenser. The resulting solution was treated in succession with 28.5 ml. triethylamine and 23.5 ml. benzylchloride. The mixture was maintained for 20 hours with stirring at 100° in an oil bath. The mixture was then cooled and the triethylamine hydrochloride removed by suction filtration and washed with 50.0 ml. of ethyl acetate. The filtrate was evaporated on a water pump vacuum at about 50° and the resulting oil taken up in 80.0 ml. ethyl acetate and washed successively with two 15 ml. portions of 3 N hydrochloric acid, two 10 ml. portions of a 5% aqueous sodium chloride solution, two 15 ml. portions of a 10% aqueous potassium bicarbonate solution and two 10 ml. portions of a 5% aqueous sodium chloride solution. The wash liquids were combined and extracted with 20.0 ml. of ethyl acetate. The ethyl acetate fractions were dried by shaking with magnesium sulfate and evaporated over a water pump vacuum at 50° to yield R,S-α-hydroxyisocaproic acid benzyl ester.

11.5 g. of R,S-α-hydroxyisocaproic acid benzyl ester thus-formed were dissolved in 50 ml. of pyridine, the solution cooled to 0° and treated with 8.2 g. of 4-fluoro-benzoyl chloride. After 4.5 hours, 20 ml. of methanol were added and the mixture allowed to stand at room temperature for 50 minutes. The solution diluted with ether, washed, with ice-cooling, with dilute hydrochloric acid, water and sodium bicarbonate solution, dried and concentrated.

The resulting oily residue was hydrogenated in 200 ml. of methanol with the addition of 1 g. of 5% palladium-charcoal catalyst. After the hydrogen uptake was complete, the mixture was filtered and concentrated. The residue was taken up in ether and the acid extracted with dilute sodium bicarbonate solution. After acidification with dilute hydrochloric acid, the mixture was extracted with ether, washed with water and concentrated. R,S-α-(4-fluorobenzoyloxy)-isocaproic acid was obtained as an oil.

(B) The process:

5.1 g. of R,S-α-(4-fluorobenzoyloxy)-isocaproic acid obtained above were heated at reflux for 1 hour in 20 ml. of thionyl chloride. The solution was concentrated and azeotroped twice with benzene. The oily residue (5.2 g.) was dissolved in 20 ml. of methylene chloride and added at 0°, with stirring, to a solution of 4.32 g. (20 mmol) of 6-aminopenicillanic acid in 20 ml. of methylene chloride and 5.6 ml. of triethylamine. The solution was maintained at 0° overnight and subsequently concentrated at 30°. The residue was dissolved in water, the solution adjusted to pH 8.0 with dilute sodium bicarbonate solution and washed with ether. The solution was then acidified to pH 2.2 with 3 N hydrochloric acid and the penicillin product extracted with ethyl acetate. After washing with water, the solution was dried over sodium sulphate and concentrated. The residue was dissolved in a little isopropanol and treated with 10 ml. of a 2 N solution of potassium 2-ethylcaproate in ethyl acetate. By the addition of low-boiling petroleum ether, there was precipitated [(R,S)-1-(p-fluorobenzoyloxy)-3-methylbutyl]-penicillin potassium. Melting point 110° (decomposition); $[\alpha]_D^{25}$ +173.6° (c.=1.0 in alcohol).

EXAMPLE 11

[(R,S)-1-(2-chloro-4-fluorobenzoyloxy)-propyl]-penicillin (A) The preparation of the starting material:

A solution of 10.0 g. of 2-chloro-4-fluorobenzoic acid, 14.8 g. of R,S-α-bromobutyric acid benzyl ester and 6.4 g. of triethylamine in 100 ml. of absolute dioxan was boiled under reflux for 20 hours. After cooling, the triethylamine hydrobromide was filtered off by suction and the filtrate evaporated in a vacuum. The residue was dissolved in 300 ml. of ethyl acetate. The ethyl acetate solution was washed with water and ice-cold 5 percent sodium bicarbonate solution, dried over magnesium sulphate and evaporated in a vacuum. The residual R,S-α-(2-chloro-4-fluorobenzoyloxy)-butyric acid benzyl ester was distilled in a high vacuum. Boiling point 130°–132°/0.05 mm. Hg.

9.4 g. of the resulting R,S-α-(2-chloro-4-fluorobenzoyloxy)-butyric acid benzyl ester were dissolved in 200 ml. of alcohol and, with the addition of Pd/C catalyst, hydrogenated up to the uptake of the theoretical amount of hydrogen. The catalyst was separated off, the filtrate evaporated in a vacuum and the residue dissolved in 200 ml. of ethyl acetate. The ethyl acetate solution was washed with water and extracted twice with 80 ml. portions of 5 percent sodium bicarbonate solution. The alkaline solution was cooled with ice, made congo-acidic with concentrated hydrochloric acid and extracted with 200 ml. of ethyl acetate. The ethyl acetate solution was washed with water, dried over magnesium sulphate and evaporated in a vacuum. The R,S-α-(2-chloro-4-fluorobenzoyloxy)-butyric acid thus obtained was recrystallized from cyclohexane. Melting point 83°–84°.

(B) The process:

A solution of 3.7 g. of R,S-α-(2-chloro-4-fluorobenzoyloxy)-butyric acid in 50 ml. of absolute chloroform was cooled to 15° and treated with 1.4 g. of triethylamine and 1.7 g. of pivaloyl chloride and stirred at —15° for 30 minutes. A solution of 3.0 g. of 6-aminopenicillanic acid and 2.8 g. of triethylamine in 50 ml. of absolute chloroform which had been cooled to —40° was then added. The mixture was stirred at —10° for 3 hours and left to stand at 4° for 48 hours. The solvent was then evaporated off in a vacuum and the residue dissolved in 100 ml. of ice-water. The aqueous solution was extracted twice with 50 ml. of ether, cooled to 2°, adjusted to pH 2.1 with 1 N hydrochloric acid and extracted twice with 100 ml. portions of ethyl acetate. The ethyl acetate solution was washed twice with 100 ml. portions of water, dried over magnesium sulphate, concentrated to ca. 50 ml. in a vacuum and treated with 400 ml. of low-boiling petroleum ether. The precipitated [(R,S)-1-(2-chloro-4-fluorobenzoyloxy)-propyl]-penicillin was reprecipitated from ethyl acetate and low-boiling petroleum ether, dried and dissolved in 100 ml. of absolute ether. The solution was filtared and, with ice-cooling, treated with 100 ml. of absolute ether which contained 7 ml. of a 2 M solution of potassium 2-ethylcaproate in isopropanol. After the addition of 200 ml. of absolute ether, the precipitated [(R,S)-1-(2-chloro-4-fluorobenzoyloxy)-propyl]-penicillin potasium was filtered off by suction, washed with absolute ether and dried. Melting point 150° (decomposition); $[\alpha]_D^{25}$ +139° (c.=1 in water).

EXAMPLE 12

[(R,S)-1-(3-bromobenzoyloxy)-pentyl]-penicillin (A) The preparation of the starting material:

A solution of 30.2 g. of m-bromobenzoic acid, 25.1 g. of R,S-α-bromocaproic acid t-butyl ester and 16.2 g. of triethylamine in 250 ml. of absolute dimethylformamide was stirred at 100° for 20 hours and then evaporated to dryness in a vacuum. With stirring, the residue was dissolved in a mixture of 600 ml. of ethyl acetate and 300 ml. of water. The ethyl acetate phase was then washed into 300 ml. of water, twice with 200 ml. portions of ice-cold 5 percent sodium bicarbonate solution and twice with 200 ml. portions of water, dried over magnesium sulphate and evaporated in a vacuum. The residual R,S-α-(3-bromobenzoyloxy)-caproic acid t-butyl ester was dissolved in 50 ml. of anhydrous trifluoroacetic acid. After standing at room temperature for 30 minutes, the solution was evaporated to dryness in a vacuum. The R,S-α-(3-bromobenzoyloxy)-caproic acid thus obtained was recrystallized from cyclohexane/low-boiling petroleum ether. Melting point 79°–80°.

(B) The process:

A solution of 12.6 g. of R,S-α-(3-bromobenzoyloxy)-caproic acid in 100 ml. of absolute chloroform was cooled to —15° and treated with 4.0 g. of triethylamine in 4.8 g. of pivaloyl chloride and stirred at —15° for 30 minutes. A solution of 8.7 g. of 6-aminopenicillanic acid and 8.1 g. of triethylamine in 100 ml. of absolute chloroform, cooled to —40°, was then added. The solution was then stirred at —10° for 3 hours and maintianed at 4° for 48 hours. The solvent was then evaporated off in a vacuum and the residue dissolved in 200 ml. of ice-water. The aqueous solution was extracted twice with 100 ml. portions of ether, cooled to 2°, adjusted to pH 2.5 with 1 N hydrochloric acid and extracted twice with 250 ml. portions of ethyl acetate. The ethyl acetate solution was washed twice with 250 ml. portions of water, dried over magnesium sulphate, concentrated to ca. 100 ml. in a vacuum and treated with 800 ml. of low-boiling petroleum ether. The precipitated [(R,S)-1-(3-bromobenzoyloxy)-pentyl]-penicillin was reprecipitated from ethyl acetate and low-boiling petroleum ether, dried and dissolved in 200 ml. of absolute ether. The solution was filtered and, with stirring and ice-cooling, treated with 200 ml. of absolute ether which contained 20 ml. of a 2 M solution of potassium 2-ethylcaproate in ethyl acetate. After the addition of 600 ml. of low-boiling petroleum ether, the precipitated [(R,S)-1-(3-bromobenzoyloxy)-pentyl]-penicillin potassium was filtered off by suction, washed with low-boiling petroleum ether and dried. Melting point 150° (decomposition); $[\alpha]_D^{25}$ +137° (c.=1 in water).

EXAMPLE 13

[(R,S)-1-(2-chlorobenzoyloxy)-pentyl]-penicillin potassium (A) The preparation of the starting material:

A solution of 42.2 g. of R,S-α-hydroxycaproic acid benzyl ester in 150 ml. of absolute pyridine was cooled to —15° and treated over a period of 15 minutes with a solution of 38.5 g. of 3-chlorobenzoyl chloride in 50 ml. of absolute tetrahydrofuran. The mixture was stirred at room temperature for 70 hours and subsequently evaporated to dryness in a vacuum. The residue was dissolved and stirred in a mixture of 300 ml. of ethyl acetate and 150 ml. of water. The ethyl acetate phase was washed twice with 150 ml. portions of ice-cold 5 percent sodium bicarbonate solution, twice with 150 ml. portions of 1 N hydrochloric acid and with 150 ml. of water, dried over magnesium sulphate and evaporated to dryness in a vacuum. The residue, R,S-α-(2-chlorobenzoyloxy)-caproic acid benzyl ester, was dissolved in 1000 ml. of alcohol and, with the addition of Pd/C, hydrogenated up to the uptake of the theoretical amount of hydrogen. The catalyst was separated off, the filtrate evaporated in a vacuum and the residue dissolved in 450 ml. of ethyl acetate. The ethyl acetate solution was washed with water and extracted twice with 250 ml. portions of ice-cold 5 percent sodium bicarbonate solution. The alkaline solution was cooled with ice, made congo-acidic with concentrated hydrochloric acid and extracted with 500 ml. of ethyl acetate. The ethyl acetate solution was washed with water, dried over magnesium sulphate and evaporated in a vacuum. The R,S-α-(2-chlorobenzoyloxy)-caproic acid thus obtained was recrystallized from cyclohexane/low-boiling petroleum ether. Melting point 65°–66°.

(B) The process:

A solution of 13.5 g. of R,S-α-(2-chlorobenzoyloxy)-caproic acid in 100 ml. of absolute chloroform was cooled to —15° and treated with 5.1 g. of triethylamine in 6.0 g. of pivaloyl chloride and stirred at —15° for 30 minutes. A solution of 10.8 g. of 6-aminopenicillanic acid and 10.1 g. of triethylamine in 100 ml. of absolute chloroform was cooled to —40° and then added. The solution was stirred at —10° for 3 hours and maintained at 4° for 48 hours. The solvent was evaporated off in a vacuum and the residue dissolved in 150 ml. of ice-water. The aqueous solution was extracted twice with 100 ml. portions of ether, cooled to 2°, adjusted to pH 2.2 with 1 N hydrochloric acid and extracted twice with 250 ml. of ethyl acetate. The ethyl acetate solution was washed twice with 250 ml. portions of water, dried over magnesium sulphate, concentrated to ca. 100 ml. in a vacuum and treated with 800 ml. of low-boiling petroleum ether. The precipitated [(R,S)-1-(2-chlorobenzoyloxy)-pentyl]-penicillin was reprecipitated from ethyl acetate and low-boiling petroleum ether, dried and dissolved in 100 ml. of absolute ether. The solution was filtered and, with stirring and ice-cooling, treated with 150 ml. of absolute ether which contained 20 ml. of a 2 M solution of potassium 2-ethylcaproate in ethyl acetate. After the addition of 700 ml. of low-boiling petroleum ether, the precipitated [(R,S)-1-(2-chlorobenzoyloxy)-pentyl]-penicillin potassium was filtered off by suction, washed with low-boiling petroleum ether and dried. Melting point 147° (decomposition); $[\alpha]_D^{25}+146°$ (c.=1 in water).

EXAMPLE 14

[(R,S)-1-(4-chlorobenzoyloxy)-pentyl]-penicillin (A) The preparation of the starting material:
A solution of 39.0 g. of R,S-α-hydroxycaproic acid benzyl ester in 100 ml. of absolute pyridine was cooled to —15° and treated over a period of 20 minutes with a solution of 35.0 g. of 4-chlorobenzoyl chloride in 50 ml. of absolute tetrahydrofuran. The mixture was stirred at room temperature for 20 hours and subsequently evaporated to dryness in a vacuum. With stirring, the residue was dissolved in a mixture of 300 ml. of ethyl acetate and 150 ml. of water. The ethyl acetate phase was washed twice with 150 ml. portions of ice-cold 5 percent sodium bicarbonate solution, twice with 150 ml. portions of 1 N hydrochloric acid and with 150 ml. of water, dried over magnesium sulphate and evaporated to dryness in a vacuum. The residual R,S-α-(4-chlorobenzoyloxy)-caproic acid benzyl ester was dissolved in 800 ml. of alcohol and, with the addition of Pd/C, hydrogenated up to the uptake of the theoretical amount of hydrogen. The catalyst was separated off, the filtrate evaporated in a vacuum and the residue dissolved in 400 ml. of ethyl acetate. The ethyl acetate solution was washed with water and extracted twice with 200 ml. portions of ice-cold 5 percent sodium bicarbonate solution. The alkaline solution was cooled with ice, made congo-acidic with concentrated hydrochloric acid and extracted with 500 ml. of ethyl acetate. The ethyl acetate solution was washed with water, dried over magnesium sulphate and evaporated in a vacuum. The R,S-α-(4-chlorobenzoyloxy)-caproic acid thus obtained was recrystallized from cyclohexane/low-boiling petroleum ether. Melting point 71°–72°.

(B) The process:
A solution of 13.5 g. of R,S-α-(4-chlorobenzoyloxy)-caproic acid in 100 ml. of absolute chloroform was cooled to —15° and treated with 5.1 g. of triethylamine and 6.0 g. of pivaloyl chloride and stirred at —15° for 30 minutes. A solution of 10.8 g. of 6-aminopenicillanic acid and 10.1 g. of triethylamine in 100 ml. of absolute chloroform was cooled to —40° and then added. The solution was stirred at —10° for 3 hours and maintained at 4° for 48 hours. The solvent was removed in a vacuum and the residue dissolved in 150 ml. of ice-water. The solution was extracted with twice 100 ml. portions of ether cooled to 2°, adjusted to pH 2.0 with 1 N hydrochloric acid and extracted twice with 250 ml. portions of ethyl acetate.
The ethyl acetate solution was washed with twice 250 ml. portions of water, dried over magnesium sulphate, concentrated to ca. 100 ml.in a vacuum and treated with 800 ml. of low-boiling petroleum ether. The precipitated [(R,S) - 1 - (4 - chlorobenzoyloxy) - pentyl] - penicillin was reprecipitated from ethyl acetate and low-boiling petroleum ether, dried and dissolved in 100 ml. of absolute ether. The solution was filtered and, with stirring and ice-cooling, treated with 100 ml. of absolute ether which contained 20 ml. of a 2 M solution of potassium 2-ethylcaproate in ethyl acetate. After the addition of 700 ml. of low-boiling petroleum ether, the precipitated [(R,S)-1-(4 - chlorobenzoyloxy) - pentyl] - penicillin potassium was filtered off by suction, washed with low-boiling petroleum ether and dried. Melting point 165° (decomposition); $[\alpha]_D^{25}+161°$ (c.=1 in water).

EXAMPLE 15

[(R,S)-1-(4-chlorobenzoyloxy)-butyl]-penicillin potassium (A) The preparation of the starting material:
A solution of 23.5 g. of 4-chlorobenzoic acid, 23.7 g. of R,S-α-bromovaleric acid t-butyl ester and 15.2 g. of triethylamine in 200 ml. of absolute dimethylformamide was stirred at room temperature for 18 hours and at 100° for 2 hours and subsequently evaporated to dryness in a vacuum. With stirring, the residue was dissolved in a mixture of 500 ml. of ethyl acetate and 200 ml. of water. The ethyl acetate phase was washed twice with 150 ml. portions of ice-cold 5 percent sodium bicarbonate solution and twice with 150 ml. portions of water, dried over magnesium sulphate and evaporated to dryness in a vacuum. The residual R,S - α - (4 - chlorobenzoyloxy) - valeric acid t-butyl ester was dissolved in 50 ml. of anhydrous trifluoroacetic acid. After standing at room temperature for 30 minutes, the solution was evaporated to dryness in a vacuum. The R,S,-α-(4 - chlorobenzoyloxy)-valeric acid thus obtained was recrystallized from cyclohexane/low-boiling petroleum ether. Melting point 62°–64°.

(B) The process:
A solution of 10.2 of R,S - α - (4 - chlorobenzoyloxy)-valeric acid in 100 ml. of absolute chloroform was cooled to —15° and treated with 4.0 g. of triethylamine and 4.8 g. of pivaloyl chloride and stirred at —15° for 30 minutes. A solution of 8.7 g. of 6-aminopenicillanic acid and 8.1 g. of triethylamine in 100 ml. of absolute chloroform was cooled to —40° and then added. The solution was stirred at —10° for 3 hours and maintained at 4° for 48 hours. The solvent was evaporated off in a vacuum and the residue dissolved in 150 ml. of ice-water. The solution was extracted twice with 100 ml. portions of ether cooled to 2°, adjusted to pH 2.0 with 3 N hydrochloric acid and extracted twice with 250 ml. portions of ethyl acetate. The ethyl acetate solution was washed twice with 250 ml. portions of water, dried over magnesium sulphate, concentrated to ca. 100 ml. in a vacuum and treated with 800 ml. of low-boiling petroleum ether. The precipitated [R,S) - 1 - (4 - chlorobenzoyloxy) - butyl] - penicillin was reprecipitated from ethyl acetate and low-boiling petroleum ether, dried and dissolved in 100 ml. of absolute ether. The solution was filtered and, with stirring and ice-cooling, treated with 50 ml. of absolute ether which contained 18 ml. of 2 M solution of potassium 2-ethylcaproate in ethyl acetate. After the addition of 800 ml. of low-boiling petroleum ether, the precipitated [(R, S) - 1 - (4 - chlorobenzoyloxy) - butyl] - penicillin potassium was filtered off by suction, washed with low-boiling petroleum ether and dried. Melting point 150° (decomposition); $[\alpha]_D^{25}+190°$ (c.=1 in water).

EXAMPLE 16

[R,S)-1-(4-chlorobenzoyloxy)-hexyl]-penicillin (A) The preparation of the starting material:
A solution of 40.8 g. of R,S-α-hydroxyenanthic acid benzyl ester in 100 ml. of absolute pyridine was cooled to —15° and treated over a period of 20 minutes with a solution of 35.0 g. of chlorobenzoyl chloride in 50 ml. of absolute tetrahydrofuran. The mixture was stirred at room temperature for 20 hours and subsequently evaporated to dryness in a vacuum. The residue was dissolved in a mixture of 500 ml. of ethyl acetate and 250 ml. of water. The ethyl acetate was washed twice with 150 ml. portions of ice-cold 5 percent sodium bicarbonate solution, twice with 150 ml. portions of 1 N hydrochloric acid and twice with 150 ml. portions of water, dried over magnesium sulphate and evaporated to dryness in a vacuum. The residue R,S-α-(4-chlorobenzoyloxy)-enanthic acid benzyl ester was dissolved in 1000 ml. of alcohol and, with the addition of Pd/C, hydrogenated up to the uptake of the theoretical amount of hydrogen. The catalyst was separated off, the filtrate evaporated in a vacuum and the residue dissolved in 350 ml. of ethyl acetate. The solution was washed with water and extracted twice with 250 ml. portions of ice-cold 5 percent sodium bicarbonate solution each time. The alkaline solution was then cooled with ice, made congo-acidic with concentrated hydrochloric acid and extracted with 500 ml. of ethyl acetate. The ethyl acetate solution was washed with water, dried over magnesium sulphate and evaporated in a vacuum. The R,S-α-(4-chlorobenzoyloxy)-enanthic acid thus obtained was recrystallized from low-boiling petroleum ether. Melting point 74°–75°.

(B) The process:

A solution of 12.8 g. of the R,S-α-(4 - chlorobenzoyloxy)-enanthic acid thus obtained in 100 ml. of absolute chloroform was cooled to −15° and treated with 4.6 g. of triethylamine and 5.4 g. of pivaloyl chloride and stirred at −15° for 30 minutes. A solution of 9.8 g. of 6-aminopenicillanic acid and 9.1 g. of triethylamine in 100 ml. of absolute chloroform was cooled to −40° and then added. The solution was stirred at −10° for 3 hours and maintained at 4° for 48 hours. The solvent was evaporated off in a vacuum and the residue dissolved in 150 ml. of ice-water. The solution was extracted twice with 100 ml. portions of ether, cooled to 2°, adjusted to pH 2.0 with 3 N hydrochloric acid and extracted twice with 250 ml. portions of ethyl acetate. The ethyl acetate solution was washed twice with 250 ml. of water each time, dried over magnesium sulphate, concentrated to ca. 100 ml. in a vacuum and treated with 800 ml. of low-boiling petroleum ether. The precipitated [(R,S)-1-(4-chlorobenzoyloxy)-hexyl]-penicillin was reprecipitated from ethyl acetate and low-boiling petroleum ether, dried and dissolved in 100 ml. of ether. The solution was treated with stirring, with an ice-cold solution of 3.4 g. of sodium bicarbonate in 50 ml. of water. The ether was evaporated off in a vacuum and the aqueous solution adjusted to pH 6.0 with glacial acetic acid, diluted with 300 ml. of isopropanol and evaporated to dryness in a vacuum. The residue was dissolved in 200 ml. of ethyl acetate. The solution was filtered and treated with 800 ml. of low-boiling petroleum ether. The precipitated [(R,S)-1-(4-chlorobenzoyloxy)-hexyl]-penicillin sodium was filtered off by suction, washed with low-boiling petroleum ether, dissolved in 200 ml. of ethyl acetate, again precipitated by addition of 800 ml. of low-boiling petroleum ether, filtered off by suction and dried. Melting point 177° (decomposition); $[\alpha]_D^{25}$ +158° (c.=1 in water).

EXAMPLE 17

[(R,S)-1-(4-chlorobenzoyloxy)-3-butenyl]-penicillin potassium (A) The preparation of the starting material:

49.6 g. of 2-allylglycine in 35.0 g. of freshly melted sodium acetate were treated in 600 ml. of glacial acetic acid at 20°–30° with 59.0 g. of isoamyl nitrate over a period of 3 hours. The mixture was stirred at 20°–30° for 24 hours and then evaporated under reduced pressure. The residue was partitioned between water and ether and the ethereal solution washed with 10% potassium hydrogen carbonate solution. The aqueous phases were made congo-acidic and extracted with ether. The ethereal solution was washed with water, dried and evaporated. There was obtained 45.1 g. of oily R,S-2-acetoxy-4-pentenoic acid which was dissolved at −10° in 600 ml. of methylene chloride, 600 ml. of isobutene and 4 ml. of concentrated sulphuric acid. After standing at room temperature for 44 hours, the isobutene was evaporated off and the methylene chloride solution washed with 10% potassium hydrogen carbonate solution, dried and evaporated. There was obtained oily R,S-2-acetoxy-4-pentenoic acid tertbutyl ester of boiling point 47°/0.1 mm.; $n_D^{22}$=1.4268.

46.4 g. of the foregoing ester were treated in 50 ml. of methanol and 25 ml. of water at 10° with stirring over a period of 15 minutes with 108 ml. of 2 N caustic soda. The mixture was stirred at room temperature for 4 hours and then extracted with ether. Working up of the ethereal extract yielded 34.9 g. of crude R,S-2-hydroxy-4-pentenoic acid tertbutyl ester. The ester was treated in 200 ml. of pyridine at −5° over a period of 15 minutes with 35.0 g. of p-chlorobenzoyl chloride. The mixture was allowed to warm to room temperature, the pyridine evaporated off and the residue partitioned between ether and 10% potassium hydrogen carbonate solution. The ethereal phase was worked up and yielded 62.7 g. of crude 2-(4-chlorobenzoyloxy)-4-pentenoic acid tertbutyl ester which was allowed to stand at room temperature for 30 minutes with 80 ml. of trifluoroacetic acid. The acid was then removed under reduced pressure, the residue taken up in ether and the ethereal solution exhaustively extracted with 10% potassium hydrogen carbonate solution. The aqueous phase was made congo-acidic and extracted with ether. Working up of the ethereal phase yielded 2-(4-chlorobenzoyloxy)-4-pentenoic acid of melting point 56°–58° (from hexane).

(B) The process:

A solution of 10.2 g. of R,S-2-(4-chlorobenzoyloxy)-4-pentenoic acid, formed above, in 120 ml. of absolute chloroform was cooled to −15° and treated with 5.6 ml. of triethylamine and 4.8 g. of pivaloyl chloride and stirred at −15° for 20 minutes. A solution of 8.7 g. of 6-aminopenicillanic acid and 11.2 ml. of triethylamine in 200 ml. of chloroform was cooled to −40° and then added. The solution was stirred at −10° for 3 hours and then maintained at 4° for 70 hours. The solvent was evaporated off in a vacuum and the residue dissolved in 200 ml. of ice-water. The solution was extracted twice with 100 ml. portions of ether, cooled to 2°, adjusted to about pH 2 with 1 N hydrochloric acid and extracted twice with 250 ml. portions of ethyl acetate. The ethyl acetate solution was washed with water, dried and concentrated to a volume of 80 ml. On the addition of 800 ml. of low-boiling petroleum ether, there precipitated [(R,S)-1-(4-chlorobenzoyloxy)-3-butenyl]-penicillin. The product was reprecipitated from ethyl acetate and low-boiling petroleum ether, dried and then dissolved in 200 ml. of absolute ether. With stirring and ice-cooling, the solution was treated with 100 ml. of absolute ether which contained 20 ml. of a 2 M solution of potassium 2-ethylcaproate in ethyl acetate. 700 ml. of low-boiling petroleum ether were then added and the precipitate filtered off. There was obtained 5.8 g. of [(R,S)-1-(4-chlorobenzoyloxy)-3-butenyl]-penicillin potassium of melting point 185° (decomposition); $[\alpha]_D^{25}$=+205.6° (c.=1 in water).

EXAMPLE 18

[(R,S)-1-(4-hydroxymethyl-benzoyloxy)-3-methylbutyl]-penicillin sodium (A) The preparation of the starting material:

9.4 g. of (R,S,)-α-bromo-isocaproic acid benzyl ester and 8.5 g. of the sodium salt of p-hydroxymethylbenzoic acid tetrahydropyranyl ether were heated to 120° in 100 ml. of dimethylformamide for 4.5 hours with stirring. The mixture was subsequently cooled, diluted with water and extracted with ether. The ethereal solution was washed with dilute sodium bicarbonate solution and water, dried over sodium sulphate and concentrated in a vacuum. The (R,S) - α-(4-tetrahydropyranyloxymethylbenzoyloxy)-isocaproic acid benzyl ester thus formed was hydrogenated in methanol with the addition of Pd./C. The catalyst was then separated off and the filtrate evaporated in a vacuum. (R,S,) - α - (4-tetrahydropyranyloxymethylbenzoyloxy)-isocaproic acid was obtained as a yellow-brown oil (8.5 g.).

(B) The process:

8.5 g. of (R,S)-α-(4-tetrahydropyranyloxymethylbenzoyloxy)-isocaproic acid formed above were dissolved in 300 ml. of absolute tetrahydrofuran. 3,4 ml. of triethylamine were added, the mixture cooled to 0° and 3.72 ml. of chloroformic acid isobutyl ester added dropwise with stirring. The mixture was stirred at 0° for 3 hours and then a solution of 5.25 g. of 6-aminopenicillanic acid in 30 ml. of methylene chloride and 10.2 ml. of triethylamine was added. After stirring for 2 hours, the mixture was filtered and concentrated in a vacuum.

The residue was dissolved in water and the solution washed with ether. It was then acidified to pH 2 with dilute hydrochloric acid and the precipitated penicillin product extracted with ethyl acetate. The ethyl acetate solution was washed with water, dried over sodium sulphate and concentrated in a vacuum. The residue was dissolved in isopropanol and treated with 10 ml. of a 2 N solution of sodium ethylcaproate in ethyl acetate. By addition of isopropyl ether, there was precipitated [(R,S)-1-(4-hydroxymethylbenzoyloxy) - 3 - methylbutyl]-penicillin sodium in a yield of 10.0 g. Melting point 200° (decomposition); $[\alpha]_D^{25}$ —104.6° (c.=1 in alcohol).

EXAMPLE 19

[(R)-1-(4-methoxymethyl-benzoyloxy)-3-methylbutyl] penicillin sodium (A) The preparation of the starting material:

26.4 g. of (R,S)-α-hydroxy-isocaproic acid were dissolved in 650.0 ml. of cold, absolute acetonitrile. The resulting solution was treated with 24.2 g. of (+)-phenylethylamine and allowed to crystallize over a period of 3 hours at 20° with stirring. The crystalline mass was filtered, washed with 100.0 ml. of cold absolute acetonitrile and filtered under a vacuum at 60° to yield the (+)-phenylethylamine salt of R - α-hydroxyisocaproic acid. $[\alpha]_D^{20}$ =+25.5° (c.=2 in methanol).

19.8 g. of the (+)-phenylethylamine salt of R-α-hydroxyisocaproic acid thus formed was dissolved in 65 ml. of 3 N hydrochloric acid and extracted three times with 100 ml. portions of ether (the hydrochloric acid phase must be acidic to Congo reagent). The ether extract was washed three times with 25 ml. portions of a 5% aqueous sodium chloride solution, dried over sodium sulfate and evaporated under vacuum. The oily product was mixed with 70 ml. of low boiling petroleum ether and the mixture maintained with stirring at 0° for about 12 hours so that crystallization could take place. The crystals were removed by filtration, washed with 50 ml. of cold petroleum ether and dried in a vacuum at 40° to yield R-α-hydroxyisocaproic acid $[\alpha]_D^{20}$=+26.27°, (c.=10 in 1 N sodium hydroxide). The (+)-phenylethylamine was recovered from the hydrochloric acid phase.

26.4 g. of R-α-hydroxy-isocaproic acid was dissolved in 180.0 ml. of absolute dioxane in a three-necked vessel equipped with a stirrer, thermometer and reflux condenser. The resulting solution was treated in succession with 28.5 ml. triethylamine and 23.5 ml. benzylchloride. The mixture was maintained for 20 hours with stirring at 100° in an oil bath. The mixture was then cooled and the triethylamine hydrochloride removed by suction filtration and washed with 50.0 ml. of ethyl acetate. The filtrate was evaporated on a water pump vacuum at about 50° and the resulting oil taken up in 80.0 ml. ethyl acetate and washed successively with two 15 ml. portions of 3 N hydrochloric acid, two 10 ml. portions of a 5% aqueous sodium chloride solution, two 15 ml. portions of a 10% aqueous potassium bicarbonate solution and two 10 ml. portions of a 5% aqueous sodium chloride solution. The wash liquids were combined and extracted with 20.0 ml. of ethyl acetate. The ethyl acetate fractions were dried by shaking with magnesium sulfate and evaporated over a water pump vacuum at 50° to yield R-α-hydroxyisocaproic acid benzyl ester, R=$[\alpha]_D^{25}$=+18.0° (c.=1.0 in methanol).

16.0 g. of the thus-formed (R)-α-hydroxyisocaproic acid benzyl ester and 10.5 ml. of triethylamine were cooled to —10° in 100 ml. of absolute tetrahydrofuran. 13.3 g. of p-methoxymethylbenzoyl chloride in 75 ml. of absolute tetrahydrofuran were added dropwise with stirring. After completion of the addition, the mixture was stirred overnight at room temperature. It was subsequently concentrated to dryness in a vacuum. The residue was taken up in ethyl acetate and the solution obtained successively washed with dilute hydrochloric acid, water, dilute sodium bicarbonate solution and water. After drying over sodium sulphate, the solution was concentrated in a vacuum. The residue was hydrogenated in methanol with the addition of Pd/C. After removal of the catalyst, the solution was concentrated in a vacuum. The residue was dissolved in ethyl acetate and the acid extracted with 1-N caustic soda. The solution obtained was acidified with dilute hydrochloric acid and the acid extracted with ethyl acetate. After washing with water and drying over sodium sulphate, the ethyl acetate extract was concentrated in a vacuum. (R)-α-(4-Methoxymethylbenzoyloxy)-isocaproic acid was obtained as an oily residue (12.8 g.).

(B) The process:

12.8 g. of (R)-α-(4 - methoxymethylbenzoyloxy)-isocaproic acid obtained above were heated at reflux for 2 hours in 50 ml. of absolute benzene and 50 ml. of thionyl chloride. The mixture was then concentrated to dryness in a vacuum and azeotroped twice with benzene. The oily residue was dissolved in 50 ml. of methylene chloride and introduced at 0° with stirring into a solution of 9.8 g. of 6-aminopenicillanic acid in 50 ml. of methylene chloride and 19.2 ml. of triethylamine. The mixture was maintained overnight at 0° and then concentrated to dryness in a vacuum. The residue was taken up in water and the soltuion washed with ether. It was subsequently acidified to pH 2.5 with dilute hydrochloric acid and the precipitated penicillin product extracted with ethyl acetate. The ethyl acetate solution was washed with water, dried over sodium sulphate and concentrated in a vacuum. The residue was dissolved in isopropanol and treated with 19.1 ml. of a 2 N solution of sodium ethylcaproate in ethyl acetate. By the addition of isopropyl ether, there was precipitated [(R) - 1 - (4 - methoxymethylbenzoyloxy)-3-methylbutyl]-penicillin sodium in a yield of 11.9 g. Melting point 180° (decomposition); $[\alpha]_D^{25}$+169.4° (c.=1 in alcohol).

EXAMPLE 20

[(R)-1-(4-acetoxymethyl-benzoyloxy)-3-methylbutyl]-penicillin sodium (A) The preparation of the starting material:

6.86 g. of (R)-α-hydroxyisocaproic acid benzyl ester and 4.5 ml. of triethylamine were cooled to —10° in 50 ml. of absolute tetrahydrofuran. 6.87 g. of p-acetoxymethylbenzoyl chloride in 50 ml. of absolute tetrahydrofuran were added dropwise with stirring. The mixture was allowed to stand overnight at room temperature and then concentrated in a vacuum. The residue was taken up in ethyl acetate and the solution successively washed with dilute hydrochloric acid, water, sodium bicarbonate solution and water. After drying over sodium sulphate, the resulting solution was concentrated in a vacuum. The residue was hydrogenated in ethyl acetate with the addition of Pd/C. After separating off the catalyst, the solution was concentrated in a vacuum. (R)-α-(4-acetoxymethylbenzoyloxy)-isocaproic acid was obtained as a yellow oil (3.7 g.).

(B) The process:

Starting from (R)-α-(4-acetoxymethylbenzoyloxy)-isocaproic acid obtained above according to the procedure described in Example 19 there was obtained [(R)-1-(4-acetoxymethylbenzoyloxy-3 - methylbutyl]-penicillin sodium of melting point 185° (decomposition); $[\alpha]_D^{25}$ +99.2° (c.=1 in alcohol).

EXAMPLE 21

[(R)-3-methyl-1-(4-phenyl-benzoyloxy)-butyl]-penicillin sodium (A) The preparation of the starting material:

6.65 g. of (R)-α-hydroxyisocaproic acid benzyl ester and 8.4 ml. of triethylamine were dissolved in 100 ml. of absolute tetrahydrofuran and the solution cooled to −15°. 6.5 g. of 4-phenylbenzoyl chloride in 50 ml. of absolute tetrahydrofuran were added dropwise with stirring over a period of 15 minutes. After completion of the addition, the mixture was stirred overnight at room temperature. The solution was subsequently concentrated in a vacuum. The residue was then taken up in ether and the acid extracted with sodium bicarbonate solution. The sodium bicarbonate solution was acidified with dilute hydrochloric acid, the acid taken up in ether and the ethereal solution washed with water. After drying over sodium sulphate, the solution was concentrated in a vacuum. (R)-α-(4-phenylbenzoyloxy)-isocaproic acid was obtained as an oily residue (4.3 g.).

(B) The process:

Starting from the (R) - α - (4-phenylbenzoyloxy)-isocaproic acid obtained above according to the procedure described in Example 19 there was obtained [(R)-3-methyl-1-(4 - phenylbenzoyloxy)-butyl]-penicillin sodium of melting point 225° (decomposition); $[\alpha]_D^{25}$ +126.4° (c. =1 in water).

EXAMPLE 22

[(R,S)-1-(4-trifluoromethyl-benzoyloxy)-butyl]-pencillin sodium (A) The preparation of the starting material:

A solution of 28.4 g. of (R,S)-α-bromo-valeric acid t-butyl ester, 25.0 g. of 4-trifluoromethyl-benzoic acid and 13.4 g. of triethylamine in 200 ml. of absolute dimethylformamide was stirred at 25° for 15 hours and at 100° for 2 hours and subsequently evaporated in a vacuum. The residue was dissolved in a mixture of 400 ml. of ethyl acetate and 150 ml. of water. The ethyl acetate phase was washed with ice-cold 5% sodium bicarbonate solution and water, dried over magnesium sulphate and evaporated in a vacuum. The (R,S)-α-(4-trifluoromethylbenzoyloxy)-valeric acid t-butyl ester thus obtained was dissolved in 50 ml. of anhydrous trifluoroacetic acid. The solution was allowed to stand at 25° for 30 minutes and then evaporated in a vacuum. The residue was dissolved in 50 ml. of absolute benzene and the solution again evaporated in a vacuum. The (R,S)-α-(4-trifluoromethylbenzoyloxy)-valeric acid thus obtained was recrystallized from cyclohexane. Melting point 71°–72°.

(B) The process:

A solution of 13.1 g. of (R,S)-α-(4-trifluoromethylbenzoyloxy)-valeric acid obtained above in 100 ml. of absolute chloroform was cooled to −15° and treated with 4.6 g. of triethylamine and 5.4 g. of pivaloyl chloride and stirred at −15° for 30 minutes. A solution of 9.8 g. of 6-aminopenicillanic acid and 9.1 g. of triethylamine in 100 ml. of absolute chloroform was cooled to −40° and then added. The solution was stirred at −10° for about 3 hours and maintained at 4° for 48 hours. The solvent was removed in a vacuum and the residue dissolved in 150 ml. of ice-water. The solution was extracted with two 100 ml. portions of ether, cooled to 2°, adjusted to pH 2.0 with 3 N hydrochloric acid and extracted with two 250 ml. portions of ethyl acetate. The ethyl acetate solution was washed with two 250 ml. portions of water, dried over magnesium sulphate, concentrated to ca 100 ml. in a vacuum and treated with 800 ml. of low-boiling petroleum ether. The precipitated [(R,S)-1-(4-trifluoromethylbenzoyloxy)-butyl]-penicillin was reprecipitated from ethyl acetate and low-boiling petroleum ether, dried and dissolved in 50 ml. of ethyl acetate. The solution was treated with an ice-cold solution of 3.3 g. of sodium bicarbonate in 50 ml. of water and vigorously and thoroughly shaken. The ethyl acetate was removed in a vacuum. The aqueous solution was adjusted to pH 6.0 with glacial acetic acid, diluted with 200 ml. of isopropanol and evaporated to dryness in a vacuum. The residue was dissolved in 150 ml. of ethyl acetate, the solution filtered and evaporated in a vacuum. The residue was dissolved in 150 ml. of ethyl acetate, the solution filtered and treated with 800 ml. of low-boiling petroleum ether. The precipitated [(R,S) - 1 - (4-trifluoromethylbenzoyloxy)-butyl]-penicillin sodium was filtered off by suction, washed with low-boiling petroleum ether, reprecipitated from ethyl acetate and low-boiling petroleum ether and dried. Melting point 89° $[\alpha]_D^{25}$ −1° (c.=3.00 in dimethylformamide).

EXAMPLE 23

[(R)-1-(4-aminomethyl-benzoyloxy)-3-methyl-butyl]-penicillin (A) The preparation of the starting material:

23.0 g. of p-cyano-benzoic acid were heated under reflux for 2.5 hours in 70 ml. of benzene, 40 ml. of thionyl chloride and 3 drops of dimethylformamide. The solution was evaporated in a vacuum and the residue dried. The resulting crude p-cyano-benzoyl chloride was dissolved in 50 ml. of tetrahydrofuran, added dropwise with stirring at −5° to a solution of 34.0 g. of D-α-hydroxyisocaproic acid benzyl ester in 250 ml. of tetrahydrofuran and 22.5 ml. of triethylamine and stirred at 0° for 1 hour and at 25° for 20 hours. The triethylamine hydrochloride was filtered off, the filtrate evaporated in a vacuum at 40°, the residue dissolved in 250 ml. of ethyl acetate, washed with 1-N hydrochloric acid, water, 8% sodium bicarbonate solution and water, dried over magnesium sulphate and evaporated in a vacuum at 40°. The resulting oil was crystallized from alcohol to yield (R)-α-(p-cyanobenzoyloxy)-isocaproic acid benzyl ester of melting point 88°–89° $[\alpha]_D^{25}$ −1° (c.=3.00 in dimethylformamide).

25.6 g. of (R)-α-(p-cyanobenzoyloxy)-isocaproic acid benzyl ester were hydrogenated in 250 ml. of dimethylformamide and 25 ml. of 3 N hydrochloric acid with 5% palladium-charcoal. The catalyst was filtered off, the filtrate adjusted to pH 7 with triethylamine, evaporated to a volume of 30 ml. in a vacuum, mixed with 300 ml. of alcohol, filtered off and dried. There was thus obtained (R) - α - (p-aminomethylbenzoyloxy)-isocaproic acid of melting point 246°–247°; $[\alpha]_D^{25}$ +7.0° (c=2.00 in 1 N hydrochloric acid).

19.0 g. of (R) - α - (p-aminomethylbenzoyloxy)-isocaproic acid were dissolved in 200 ml. of water, 400 ml. of dioxan and 10.0 g. of potassium carbonate and, over a period of 10 minutes treated portionwise with a solution of 14.0 g. of o-nitrophenylsulphenyl chloride in 300 ml. of dioxan. The pH was held between 7–8 by the addition of a little potassium carbonate. After 20 minutes, the solution was filtered, evaporated to a volume of 100 ml. in a vacuum at 30°, diluted with 100 ml. of water and extracted with 100 ml. of ether. The aqueous phase was adjusted to pH 2 at 0° with 3 N sulphuric acid, extracted twice with 100 ml. portions of ethyl acetate, washed three times with 75 ml. portions of water, dried over magnesium sulphate and evaporated in a vacuum at 40°. (R)-α-[4-(o-nitrophenylsulphenylaminomethyl) - benzoyloxy] - isocaproic acid was obtained as a resin which was reacted with a triethylamine salt of 6-aminopenicillanic acid without further purification.

(B) The process:

7.0 g. of pivalic acid chloride were added dropwise with stirring at −15° to 24.0 g. of (R)-α-[4-(o-nitrophenylsulphenylaminomethyl)-benzoyloxy]-isocaproic acid in 150 ml. of tetrahydrofuran and 8 ml. of triethylamine. After 20 minutes, a cold (−15°) solution of 13 g. of 6-aminopenicillanic acid in 80 ml. of chloroform and 16 ml. of triethylamine was added, the mixture was stirred for 1 hour at −10° and for 20 hours at 25°. The solvent was distilled off in a vacuum at 20°, the residue suspended in 150 ml. of ethyl acetate, filtered from insolubles and the filtrate extracted with 200 ml. of ice-water. The aqueous solution was adjusted to pH 0.5 with 3 N sulphuric acid at 0° and extracted with 300 ml. of ethyl acetate, washed three times with a 5% sodium chloride solution, dried over magnesium sulphate and evaporated in a vacuum at 20°. The residue was dissolved in 400 ml. of ether, filtered and the filtrate mixed with 28 ml. of 2 N sodium 2-ethylcaproate in ethyl acetate. The sodium salt of the penicillin product was filtered off by suction, washed with ether and petroleum ether and dried.

34.0 g. of the foregoing sodium salt were dissolved in 300 ml. of water and 300 ml. of dioxan and cooled to 0°, 8.0 g. of thioacetamide were added with stirring and 96 ml. of 1 N hydrochloric acid were then added dropwise over a period of 15 minutes. The mixture was further stirred at 0° for 1.5 hours, the precipitate filtered off, rinsed with 100 ml. of water and evaporated at 20° and 0.1 torr to a volume of 500 ml. The solution was extracted with 200 ml. of ethyl acetate and the aqueous phase adjusted to pH 4.2 with triethylamine. The solution was evaporated to 350 ml. at 20° and 0.1 torr, filtered and thereafter further evaporated to 60 ml. The penicillin product crystallized from this concentrate at 0°. It was suspended in 700 ml. of water, dissolved in 1 N hydrochloric acid at pH 2.0, filtered, adjusted to pH 4.2 with triethylamine, concentrated to 100 ml. at 20° and 0.1 torr and crystallized for 24 hours at 0°. There was obtained (R) - 1 - [(4 - aminoethylbenzoyloxy) - 3 - methylbutyl]-penicillin; $[\alpha]_D^{25}$ +183° (c.=1.00 in a mixture of 50 vol. percent each of water and β-acetamic-butyric acid ethyl ester); melting point from 200° (slow decomposition).

EXAMPLE 24

[(R,S)-1-(p-cyanobenzoyloxy)-butyl]-penicillin potassium (A) The preparation of the starting material:
A solution of 35.5 g. of (R,S)-α-bromo-valeric acid t-butyl ester, 29.4 g. of p-cyanobenzoic acid and 20.2 g. of triethylamine in 300 ml. of absolute dimethylformamide was stirred at 25° for 20 hours and at 100° for 2 hours and subsequently evaporated to dryness in a vacuum. The residue was dissolved in a mixture of 350 ml. of ethyl acetate and 150 ml. of water. The ethyl acetate phase was washed with ice-cold 5% sodium bicarbonate solution and water, dried over magnesium sulphate and evaporated in a vacuum. The residue was dissolved in 400 ml. of low-boiling petroleum ether. After standing at —10° for 20 hours, the mixture was filtered and the filtrate evaporated in a vacuum. The residual (R,S)-α-(p-cyanobenzoyloxy)-valeric acid t-butyl ester was dissolved in 75 ml. of anhydrous trifluoroacetic acid. The solution was maintained at 25° for 30 minutes and then evaporated in a vacuum. The residue was dissolved in 100 ml. of absolute benzene and the solution evaporated to dryness in a vacuum. The (R,S)-α-(p-cyanobenzoyloxy)-valeric acid thus obtained was recrystallized from ethyl acetate/petroleum ether. Melting point 95°–96°.

(B) The process:
Starting from (R,S)-α-(p-cyanobenzoyloxy)-valeric acid produced above according to the procedure described in Example 4 there was obtained [(R,S)-1-(p-cyanobenzoyloxy)-butyl]-penicillin potassium of melting point 157° (decomposition); $[\alpha]_D^{25}$ —198 (c.=1 in water).

EXAMPLE 25

[(R,S)-1-(p-carbamoyl-benzoyloxy)-pentyl]-penicillin potassium (A) The preparation of the starting material:
A solution of 60.3 g. of (R,S)-α-bromo-caproic acid t-butyl ester, 43.3 g. of terephthalamidic acid and 26.5 g. of triethylamine in 400 ml. of absolute dimethylformamide was stirred at 25° for 20 hours and at 100° for 2 hours and subsequently evaporated in a vacuum. The residue was dissolved in a mixture of 500 ml. of ethyl acetate and 500 ml. of water and separated off from a little insoluble material. The ethyl acetate phase was washed with ice-cold 5% sodium bicarbonate solution and water, dried over magnesium sulphate and evaporated in a vacuum. The (R,S) - α - (p-carbamoylbenzoyloxy)-caproic acid t-butyl ester thus obtained was dissolved in 100 ml. of anhydrous trifluoroacetic acid. The solution was maintained at 25° for 30 minutes and then evaporated in a vacuum. The (R,S)-α-(p-carbamoylbenzoyloxy)-caproic acid thus obtained was recrystallized from methanol. Melting point 175°–177°.

(B) The process:
Starting from (R,S)-α-(p-carbamoylbenzoyloxy)-caproic acid produced above according to the procedure described in Example 4 there was obtained [(R,S)-1-(p-carbamoylbenzoyloxy)-pentyl]-penicillin potassium of melting point 169° (decomposition); $[\alpha]_D^{25}$ +144° (c.=1 in water.)

EXAMPLE 26

[(R,S)-1-(p-hydroxy-benzoyloxy)-3-methylbutyl]-penicillin sodium (A) The preparation of the starting material:
14.0 g. of (R,S,)-α-bromo-isocaproic acid benzyl ester and 12.1 g. of the sodium salt of 4-tetrahydropyranyloxy-bonzoic acid were stirred for 3 hours at 120° in 100 ml. of dimethylformamide. The mixture was subsequently cooled, diluted with water and extracted with high-boiling petroleum ether. The petroleum ether solution was washed with dilute sodium bicarbonate solution, washed with water, dried over sodium sulphate and evaporated in a vacuum. The residue was hydrogenated in methanol with the addition of Pd/C. After removal of the catalyst, the solution was evaporated in a vacuum. (R,S)-α-(tetrahydropyranyloxy-benzoyloxy)-isocaproic acid was obtained as an oily residue (12.5 g.).

(B) The process:
Starting from (R,S)-α-(4-tetrahydropyranyloxybenzoyloxy)-isocaproic acid produced above according to the procedure described in Example 18 there was obtained [(R,S) - 1 - (p-hydroxy-benzoyloxy) - 3 - methylbutyl]-penicillin sodium of melting point 190° (decomposition); $[\alpha]_D^{25}$ +139° (c.=1 in water).

EXAMPLE 27

[(R)-1-(p-anisoyloxy)-3-methoxybutyl]-penicillin sodium (A) The preparation of the starting material:
26.0 g. of p-anisoyl chloride in 50 ml. of tetrahydrofuran were added dropwise with stirring at —10° to a solution of 33.8 g. of D-α-hydroxy-isocaproic acid benzyl ester and 22.5 ml. of triethylamine in 170 ml. of tetrahydrofuran, stirred for an additional hour at 0° and at 25° for 20 hours. The triethylamine hydrochloride was filtered off, the filtrate evaporated in a vacuum at 40°, the residue, in 250 ml. of ethyl acetate, washed with 1 N hydrochloric acid, water, 8% sodium bicarbonate solution and water, dried over magnesium sulphate and evaporated in a vacuum at 40°. The resulting oil was dissolved in benzene and chromatographed on a column of 300 g. of kieselgel. After elution with 750 ml. of benzene, the eluate was evaporated in a vacuum at 40°. (R)-α-(p-anisoyloxy)-isocaproic acid benzyl ester was obtained as a colorless oil; $[\alpha]_D^{25}$ +5° (c.=4.5 in alcohol).

32.0 g. of (R)-α-(p-anisoyloxy)-isocaproic acid benzyl ester were hydrogenated in 200 ml. of alcohol with palladium-charcoal. The catalyst was filtered off and the filtrate evaporated in a vacuum at 40°. The oil thus obtained was dissolved in excess 8% sodium bicarbonate solution, washed with ether, the aqueous phase adjusted to pH 2 with concentrated hydrochloric acid and extracted with 200 ml. of ether, washed with water, dried over magnesium sulphate and evaporated in a vacuum. (R)-α-(p-anisoyloxy)-isocaproic acid was obtained as a colorless oil; $[\alpha]_D^{25}$ +2.4° (c.=4.0 in alcohol).

35.8 g. of the foregoing acid were boiled at reflux for 3 hours in 100 ml. of benzene and 30 ml. of thionyl chloride, evaporated in a vacuum at 45° and evaporated twice with 50 ml. portions of benzene and dried. The oily (R)-α-(p-anisoyloxy)-isocaproic acid chloride thus obtained was immediately reacted with the triethylammonium salt of 6-aminopenicillanic acid.

(B) The process:

Starting from (R)-α-(p-anisoyloxy)-isocaproic acid chloride according to the procedure described in Example 1 there was obtained [(R)-1-(p-anisoyloxy)-3-methoxybutyl]-penicillin sodium; $[\alpha]_D^{25}$ −186° (c.=1.00 in water); melting point 187°–190° (decomposition).

EXAMPLE 28

[(R,S)-1-(p-anisoyloxy)-propyl]-penicillin potassium (A) The preparation of the starting material:

A solution of 30.4 g. of p-anisic acid, 51.4 g. of (R,S)-α-bromo-butyric acid benzyl ester and 22.3 g. of triethylamine were boiled under reflux for 20 hours in 400 ml. of absolute dioxan. After cooling, the triethylamine hydrobromide was filtered off by suction and the filtrate evaporated in a vacuum. The residue was taken up in 500 ml. of ethyl acetate. The ethyl acetate solution was washed with water, ice-cold 5% sodium bicarbonate solution and water, dried over magnesium sulphate and evaporated in a vacuum. The residual (R,S)-α-(p-anisoyloxy)-butyric acid benzyl ester was distilled in a high vacuum; boiling point 187°–188°/0.5 mm. Hg.

29.5 g. of (R,S)-α-p-anisoyloxy)-butyric acid benzyl ester were dissolved in 650 ml. of alcohol and, with the addition of Pd/C, hydrogenated up to the uptake of the theoretical amoint of hydrogen. The catalyst was separated off, the filtrate evaporated in a vacuum and the residue dissolved in 500 ml. of ethyl acetate. The ethyl acetate solution was washed with water and extracted twice with 150 ml. portions of 5% sodium bicarbonate solution. The alkaline solution was cooled with ice, made congo-acidic with concentrated hydrochloric acid and extracted with 450 ml. of ethyl acetate. The ethyl acetate solution was washed with water, dried over magnesium sulphate and evaporated in a vacuum. The (R,S)-α-p-anisoyloxy)-butyric acid thus obtained was recrystallized from cyclohexane. Melting point 79°–80°.

(B) The process:

Starting from (R,S)-α-(p-anisoyloxy)-butyric acid according to the procedure described in Example 4 there was obtained [(R,S)-1-(p-anisoyloxy)-propyl]-penicillin potassium of melting point 175° (decomposition); $[\alpha]_D^{25}$ +211° (c.=1 in water).

EXAMPLE 29

[(R)-1-(o-anisoyloxy)-2-methylpropyl]-penicillin potassium (A) The preparation of the starting material:

17.1 g. of o-anisoyl chloride in 50 ml. of ether were added dropwise with stirring to a cold (−15°) solution of 11.8 g. of D-α-hydroxy-isovaleric acid in 50 ml. of pyridine. The mixture was stirred at −15° for 2 hours. The pyridine was distilled off in a vacuum at 45°. The residue was dissolved in excess ice-cold 3 N hydrochloric acid, extracted with 150 ml. of ethyl acetate, washed with 3 N hydrochloric acid, extracted with 150 ml. of ethyl acetate, washed with 3 N hydrochloric acid and water and the ethyl acetate repeatedly extracted with 8% sodium bicarbonate solution. The combined sodium bicarbonate solutions adjusted to pH 2 with concentrated hydrochloric acid and extracted with benzene. The benzene solution was washed with water, dried over magnesium sulphate and evaporated in a vacuum. (R)-α-(o-anisoyloxy)-isovaleric acid was obtained as a colorless oil.

(B) The process:

Starting from (R)-α-(o-anisoyloxy)-isovaleric acid obtained above and according to the procedure described in Example 4 there was obtained [(R)-1-(o-anisoyloxy)-2-methylpropyl]penicillin potassium salt. $[\alpha]_D^{25}$ +180° (c.=1.00 in water); melting point from 150° (slow decomposition).

EXAMPLE 30

[(R)-3-methyl-1-(veratroyloxy)-butyl]-penicillin sodium (A) The preparation of the starting material:

18.3 g. of veratroyl chloride in 40 ml. of tetrahydrofuran were added dropwise at −10° with stirring to a solution of 20.2 g. of D-α-hydroxy-isocaproic acid benzyl ester and 12.7 ml. of triethylamine in 100 ml. of tetrahydrofuran, stirred at 0° for 1 hour and at 25° for 20 hours. The triethylamine hydrochloride was filtered off, the filtrate evaporated in a vacuum at 40°. The resulting oil in 200 ml. of ethyl acetate, was washed with 1 N hydrochloric acid, water, 8% sodium bicarbonate solution and water, dried over magnesium sulphate and evaporated in a vacuum at 40°. The resulting oil was chromatographed on a column of 300.0 g. of kieselgel 30–70 mesh ASTM in benzene. After elution with 700 ml. of benzene, the eluate was evaporated in a vacuum. (R)-α-veratroyloxy-isocaproic acid benzyl ester was obtained as a colorless oil which was hydrogenated in 200 ml. of alcohol with 5% palladium-charcoal. The catalyst was filtered off, the filtrate evaporated in a vacuum at 45°, the residue dissolved in excess bicarbonate solution, extracted with ether, the aqueous phase adjusted to pH 2 with concentrated hydrochloric acid, extracted twice with 100 ml. portions of ether, washed with water, dried over magnesium sulphate and evaporated in a vacuum. (R)-α-veratroyloxy-isocaproic acid was thus obtained as a colorless oil.

12.5 g. of the foregoing acid were boiled at reflux in 50 ml. of benzene and 15 ml. of thionyl chloride for 2 hours, evaporated in a vacuum at 45°, evaporated twice with 20 ml. portions of benzene and dried in a vacuum at 45°. (R)-α-veratroyloxy-isocaproic acid chloride was obtained as an oil which was immediately reacted with the triethylammonium salt of 6-aminopenicillanic acid.

(B) The process:

Starting from (R)-α-veratroyloxy-isocaproic acid chloride in accordance with the procedure described in Example 1 there was obtained [(R)-3-methyl-1-(veratroyloxy)-butyl]penicillin sodium salt; $[\alpha]_D^{25}$ +160° (c.=1 in water); melting point from 145° (slow decomposition).

EXAMPLE 31

[(R)-3-methyl-1-(3,4,5-trimethoxy-benzoyloxy)-butyl]-penicillin sodium (A) The preparation of the starting material:

24.1 g. of 3,4,5-trimethoxybenzoyl chloride in 50 ml. of chloroform were added dropwise with stirring to a cold (−15°) solution of 13.2 g. of D-α-hydroxy-isocaproic acid in 70 ml. of pyridine. The mixture was stirred at −10° for 2 hours and at 20° for 20 hours. The pyridine was distilled off in a vacuum at 45°. The residue was dissolved in excess ice-cold 3 N hydrochloric acid, extracted with 200 ml. of ethyl acetate, washed with 3 N hydrochloric acid and water and the ethyl acetate repeatedly extracted with 8% sodium bicarbonate solution. The combined sodium bicarbonate solutions were rinsed with ethyl acetate, adjusted to pH 2 with concentrated hydrochloric acid and extracted with 150 ml. of ethyl acetate. The ethyl acetate solution was washed four times with 50 ml. portions of water, dried over magnesium sulphate and evaporated in a vacuum at 40°. The residue was suspended in 50 ml. of ice-cold ether, filtered off in a vacuum and the filtrate evaporated in a vacuum. The oil obtained was dissolved in a mixture of 40 ml. each of ether and petroleum ether and, after 1 hour, filtered off from a further small amount of crystals. From the filtrate, by evaporation in a vacuum (R)-α-(3,4,5-trimethoxybenzoyloxy)-isocaproic acid was obtained as a colorless honey. 150 g. of this acid were boiled at reflux for 2 hours in 50 ml. of benzene and 15 ml. of thionyl chloride, evaporated in a vacuum at 45°, evaporated twice with 30 ml. portions of benzene and dried in a vacuum at 45°. The (R)-α-(3,4,5-trimethoxybenzoyloxy)-isocaproic acid chloride thus obtained was immediately reacted with the triethylammonium salt of 6-aminopenicillanic acid.

(B) The process:

Starting from (R)-α-(3,4,5-trimethoxybenzoyloxy)-isocaproic acid chloride thus obtained and according to the procedure described in Example 1 there was obtained [(R) - 3 - methyl-1-(3,4,5-trimethoxybenzoyloxy)-butyl]-penicillin sodium salt; $[\alpha]_D^{25}$ +156° (c.=1.00 in water); melting point from 140° (slow decomposition).

EXAMPLE 32

[(R,S)-1-(piperonyloyloxy)-pentyl]-penicillin potassium (A) The preparation of the starting material:

A solution of 35.1 g. of (R,S)-α-bromo-caproic acid t-butyl ester, 24.9 g. of piperonylic acid and 15.9 g. of triethylamine in 250 ml. of absolute dimethylformamide was stirred at 25° for 20 hours and at 100° for 2 hours and subsequently evaporated to dryness in a vacuum. The residue was dissolved in a mixture of 400 ml. of ethyl acetate and 150 ml. of water. The ethyl acetate phase was then washed with ice-cold 5% sodium bicarbonate solution and water, dried over magnesium sulphate and evaporated in a vacuum. The (R,S)-α-piperonyloyloxy-caproic acid t-butyl ester thus obtained was dissolved in 60 ml. of anhydrous trifluoroacetic acid. The solution was maintained at 25° for 2 hours and then evaporated to dryness in a vacuum. The residue was dissolved in 100 ml. of absolute benzene and the solution evaporated to dryness in a vacuum. The residue was dissolved in 350 ml. of ethyl acetate. The ethyl acetate solution was washed with 150 ml. of water and then extracted with three 150 ml. portions of 5% sodium bicarbonate solution. The alkaline solution was made congo-acidic with 3 N hydrochloric acid and extracted with 400 ml. of ethyl acetate. The ethyl acetate solution was washed with water, dried over magnesium sulphate and evaporated to dryness in a vacuum. The (R,S)-α-piperonyloyloxy-caproic acid thus obtained was recrystallized from cyclohexane. Melting point 66°–67°.

(B) The process:

Starting from (R,S)-α-piperonyloyloxy-caproic acid according to the procedure described in Example 4 there was obtained [(R,S)-1-piperonyloyloxypentyl]-penicillin potassium of melting point 140° (decomposition): $[\alpha]_D^{25}$ +174° (c.=1 in water).

EXAMPLE 33

[(R)-1-(p-aminobenzoyloxy)-3-methylbutyl]-penicillin sodium (A) The preparation of the starting material:

22.0 g. of (R)-α-(p-nitrobenzoyloxy)-isocaproic acid benzyl ester (obtained in accordance with Example 34, Part (A) were hydrogenated in 400 ml. of alcohol with 5% palladium-charcoal. The catalyst was filtered off, the filtrate evaporated in a vacuum at 40° and the residue crystallized from benzene. There was thus obtained (R)-α-(p-aminebenzoyloxy)-isocaproic acid of melting point 151°–153°; $[\alpha]_D^{25}$ −7.6° (c.=2.00 in methanol).

25.0 g. of (R)-α-(p-aminobenzoyloxy)-isocaproic acid and 12.0 g. of N-hydroxy-succinimide were dissolved in 500 ml. of acetonitrile, treated with 21.0 g. of dicyclohexylcarbodiimide and stirred at 20° for 3 hours. The dicyclohexylurea was filtered off and the filtrate evaporated in a vacuum at 40°. The residue, dissolved in 200 ml. of ethyl acetate, was washed with 5% sodium bicarbonate and water. There was obtained, after drying over magnesium sulphate and evaporation in a vacuum at 40°, (R)-α-(p-aminobenzoyloxy)-isocaproic acid N-hydroxy-succinimide ester as a resin which was employed for the reaction with the triethylammonium salt of 6-aminopenicillanic acid without further purification.

(B) The process:

13.0 g. of 6-aminopenicillanic acid in 100 ml. of chloroform and 16 ml. of triethylamine were combined with 20.0 g. of (R)-α-(p-aminobenzoyloxy)-isocaproic acid N-hydroxysuccinimide ester in 50 ml. of chloroform maintained at 25° for 24 hours and then evaporated in a vacuum at 25°. The residue was dissolved in 200 ml. of ice-water, washed three times with 50 ml. portions of ethyl acetate, adjusted to pH 2.5 with 3 N sulphuric acid at 0° and extracted with 400 ml. of ethyl acetate. The ethyl solution was washed three times with water, dried over magnesium sulphate, evaporated in a vacuum to a volume of 100 ml. and treated with 20 ml. of a 2 N solution of sodium 2-ethylcaproate in ethyl acetate. After 1 hour, the sodium salt was filtered off, washed with ethyl acetate ether and petroleum ether and dried at 20°. There was thus obtained [(R)-1-(p-aminobenzoyloxy)-3-methylbutyl ]-penicillin sodium salt; $[\alpha]_D^{25}$ +132.3° (c.=1 in water); melting point from 205° (slow decomposition).

EXAMPLE 34

[(R-)-3-methyl-1-(p-nitrobenzoyloxy)-butyl]-penicillin sodium (A) The preparation of the starting material:

37.2 g. of p-nitrobenzoyl chloride in 150 ml. of tetrahydrofuran were added dropwise at −15° with stirring over a period of 30 minutes to a solution of 44.5 g. of D-α-hydroxy-isocaproic acid benzyl ester and 28 ml. of triethylamine in 300 ml. of tetrahydrofuran and stirred at 0° for 2 hours and at 25° for 20 hours. The triethylamine hydrochloride was filtered off, the filtrate evaporated in a vacuum at 40° and the residue, in ethyl acetate, washed neutral with 1 N hydrochloric acid, water, 8% sodium bicarbonate and water. After drying over magnesium sulphate, the ethyl acetate was distilled off and the resulting oil crystallized from 25 ml. of alcohol at −25°. The (R)-α-(p-nitrobenzoyloxy)-isocaproic acid benzyl ester thus obtained, melting point 48°–49°, $[\alpha]_D^{25}$ +11.5° (c.=3 in alcohol), was dissolved in 70 ml. of glacial acetic acid, treated with 70 ml. of glacial acetic acid, treated with 70 ml. of 33% hydrobromic acid in glacial acetic acid, evaporated in a vacuum at 45° after 20 hours and the oil obtained dissolved in excess 8% sodium bicarbonate solution, extracted three times with 100 ml. portions of ether and the aqueous phase adjusted to pH 2 with concentrated hydrochloric acid. The acid was then extracted with ether, washed with water, dried over magnesium sulphate, strongly concentrated in a vacuum and crystallized by addition of petroleum ether. There was thus obtained (R)-α-(p-nitrobenzoyloxy)-isocaproic acid of melting point 79°–81°; $[\alpha]_D^{25}$ +11.9° (c.=4.00 in alcohol).

16.0 g. of the foregoing acid are boiled at reflux for 2 hours in 80 ml. of benzene with 20 ml. of thionyl chloride, evaporated in a vacuum at 45°, evaporated twice with 30 ml. portions of benzene and dried in a vacuum at 45°. The oily (R)-α-(p-nitrobenzoyloxy)-isocaproic acid chloride thus obtained was immediately reacted with the trimethylammonium salt of 6-aminopenicillanic acid.

(B) The process:

Starting from (R)-α-(p-nitrobenzoyloxy)-isocaproic acid according to the procedure described in Example 1 there was obtained [(R)-3-methyl-1-(p-nitrobenzoyloxy)-butyl]-penicillin sodium salt; $[\alpha]_D^{25}$ +187° (c.=1.00 in water), melting point from 180° (decomposition).

EXAMPLE 35

[(R)-1(p-ethoxyacetamido-benzoyloxy)-3-methylbutyl] - penicillin sodium (A) The preparation of the starting material:

20.0 g. of p-aminobenzoic acid methyl ester and 13.7 g. of ethoxyacetic acid in 200 ml. of acetonitrile were treated at —5° with 27.2 g. of dicyclohexylcarbodiimide in 100 ml. of acetonitrile and left to stand at 25° for 3 hours. The dicyclohexylurea was filtered off, the filtrate evaporated in a vacuum at 40°, the residue dissolved in 200 ml. of ethyl acetate, washed with 3 N hydrochloric acid, water, 8% sodium bicarbonate solution and water, dried over magnesium sulphate and evaporated in a vacuum at 40°. By crystallization from ethyl acetate/petroleum ether, there was obtained p-ethoxyacetamidobenzoic acid methyl ester of melting point 83°–85°.

21.5 g. of p-ethoxyacetamidobenzoic acid methyl ester were dissolved in 200 ml. of methanol and saponified at 25° for 24 hours with 4.0 g. of sodium hydroxide in 20 ml. of water. The solution was evaporated in a vacuum at 40°, the residue dissolved in 150 ml. of water, washed twice with 50 ml. of ether each time, adjusted to pH 2 with concentrated hydrochloric acid, extracted twice with 100 ml. portions of ethyl acetate, dried over magnesium sulphate, evaporated in a vacuum at 40° and crystallized from ethyl acetate/petroleum ether. There was thus obtained p-ethoxyacetamidobenzoic acid of melting point 175°–177°.

13.0 g. of p-ethoxyacetamidobenzoic acid were boiled under reflux for 1.5 hours in 50 ml. of benzene and 25 ml. of thionyl chloride, evaporated in a vacuum at 40°, evaporated twice with 20 ml. portions of benzene and dried. 14.5 g. of this acid chloride were dissolved in 30 ml. of tetrahydrofuran and, with stirring, added dropwise at —10° to a solution of 14.1 g. of D-α-hydroxy-isocaproic acid benzyl ester in 150 ml. of tetrahydrofuran and 8.9 ml. of triethylamine. After 1 hour at —5° and 20 hours at 25°, the triethylamine hydrochloride was filtered off, the filtrate evaporated in a vacuum at 40°, the residue, in 150 ml. of ethyl acetate, washed 1 N hydrochloric acid, water, 8% sodium bicarbonate solution and water, dried over magnesium sulphate and evaporated in a vacuum. (R)-α-(p-ethoxyacetamidobenzolyloxy)-isocaproic acid benzyl ester was obtained as an oil which was hydrogenated in 300 ml. of alcohol with 5% palladium-charcoal. The catalyst was filtered off and the filtrate evaporated in a vacuum at 40°. The residue was dissolved in excess sodium bicarbonate solution, extracted twice with 50 ml. portions of ether, adjusted to pH with concentrated hydrochloric acid and extracted twice with 80 ml. portions of ethyl acetate. The ethyl acetate solution was washed with water, dried over magnesium sulphate and evaporated in a vacuum. (R)-α-(p-ethoxyacetamidobenzoyloxy)-isocaproic acid was obtained as an oil.

16.6 g. of the foregoing acid was boiled at reflux for 2 hours in 50 ml. of benzene and 12 ml. of thionyl chloride evaporated in a vacuum at 45° and thereafter evaporated twice with 30 ml. portions of absolute benzene. (R)-α-(p - ethoxy - acetamidobenzoyloxy) - isocaproic acid chloride was obtained as an oil which was immediately reacted with the triethylammonium salt of 6-aminopenicillanic acid.

(B) The process:
Starting from (R)-α - (p-ethoxyacetamidobenzoyloxy)-isocaproic acid chloride according to the procedure described in Example 1 there was obtained [(R)-1-(p-ethoxyacetamidobenzoyloxy)-3-methylbutyl] - penicillin sodium salt; $[\alpha]_D^{25}$ +160° (c.=1 in water; melting point from 205° (decomposition).

EXAMPLE 36

[(R,S)-1-(p-methanesulfonylamido-benzoyloxy)-3-methylbutyl]-penicillin sodium (A) The preparation of the starting material:
A solution of 46.4 ml. of methanesulfonyl chloride in 80 ml. of ether and a solution of 18.0 g. of sodium hydoxide in 100 ml. of water were simultaneously added dropwise with stirring within 45 minutes to a cold (0°) solution of 41.0 g. of p-aminobenzoic acid in 200 ml. of water and 18.0 g. of sodium hydroxide. The mixture was stirred at 0° for 1 hour and at 20° for 20 hours. The suspension was extracted twice with 100 ml. portions of ether. The slightly alkaline aqueous solution was adjusted to pH 1 with concentrated hydrochloric acid and extracted three times with 200 ml. portions of ethyl acetate. The ethyl acetate solution was washed with 3 N hydrochloric acid and water, dried over magnesium sulphate and crystallized by evaporation in a vacuum at 40°. p-Methanesulfonylamido-benzoic acid of melting point 230°–232° (decomposition) was thus obtained. This acid was dissolved in the calculated amount of 1 N caustic soda, evaporated in a vacuum and the resulting sodium salt dried in a vacuum at 90°.

28.4 g. of the sodium salt of p-methanesulfonylamidobenzoic acid were introduced with stirring into a solution of 28.5 g. of DL-α-bromo-isocaproic acid benzyl ester in 300 ml. of dimethylformamide. The suspension was heated to 100° for 20 hours. The diethylformamide was distilled off in a vacuum at 60° and the residue, in 300 ml. of ethyl acetate was washed with 3 N hydrochloric acid, water, 8% sodium bicarbonate and water, evaporated in a vacuum at 45° and dried. (R,S)-α-(p-methanesulfonylamidobenzoyloxy)-isocaproic acid benzyl ester was obtained as an oil which was hydrogenated in 200 ml. of alcohol with 5% palladium-charcoal. The catalyst was filtered off, the filtrate evaporated in a vacuum at 45°, the residue dissolved in excess 8% sodium bicarbonate solution and extracted with ether. The sodium bicarbonate solution was then adjusted to pH 2 with concentrated hydrochloric acid, extracted with ethyl acetate, washed with water, dried over magnesium sulphate and evaporated in a vacuum at 45°. The residue crystallized on trituration with petroleum ether. There was obtained (R,S)-α-(p-methanesulfonylamidobenzoyloxy)-isocaproic acid of melting point 165°–168°.

6.6 g. of the foregoing acid were boiled at reflux for 2 hours in 30 ml. of benzene with 7 ml. of thionyl chloride, evaporated in a vacuum at 45°, evaporated twice with 10 ml. portions of benzene and dried in a vacuum at 45°. The oily (R,S)-α-(p-methanesulfonylamidobenzoyloxy)-isocaproic acid chloride thus obtained was immediately reacted with the triethyl ammonium salt of 6-aminopenicillanic acid.

(B) The process:
Starting from (R,S)-α-(p-methanesulfonylamidobenzoyloxy)-isocaproic acid chloride according to the procedure described in Example 1 there was obtained [(R,S)-1-(p-methanesulfonylamidobenzoyloxy) - 3 - methylbutyl]-penicillin sodium salt; $[\alpha]_D^{25}$ +166.5° (c.=1.00 in water); melting point from 196° (decomposition).

EXAMPLE 37

[(R,S)-1-(p-pyrrol-1-yl-benzoyloxy)-butyl]-penicillin potassium (A) The preparation of the starting material:
A solution of 54.2 g. of (R,S)-α-bromo-valeric acid benzyl ester, 28.1 g. of p-(pyrrol-1-yl)-benzoic acid and 15.2 g. of triethylamine in 200 ml. of absolute dimethylformamide was stirred at 25° for 20 hours and at 100° for 3 hours and subsequently evaporated to dryness in a vacuum. The residue was dissolved in a mixture of 400 ml. of ethyl acetate and 250 ml. of water. The ethyl acetate phase was washed with ice-cold 5% sodium bicarbonate solution and water, dried over magnesium sulphate and evaporated in a vacuum. The (R,S)-α-(p-pyrrol-1-yl-benzoyloxy)-valeric acid benzyl ester thus obtained was dissolved in 1 liter of alcohol and, with the addition of Pd/C, hydrogenated until cessation of hydrogen uptake. The catalyst was separated off and the filtrate evaporated in a vacuum. The (R,S) - α - (p-pyrrol-1-benzoyloxy)-valeric acid which was obtained in crystalline form was recrystallized from benzene. Melting point 133°–134°.

(B) The process:

Starting from (R,S) - α - (p-pyrrol-1-yl-benzoyloxy)-valeric acid according to the procedure described in Example 4 there was obtained [(R,S)-1-(p-pyrrol-1-yl-benzoyloxy)-butyl]-penicillin potassium of melting point 150° (decomposition); $[\alpha]_D^{25}$ +176° (c.=1 in water).

EXAMPLE 38

[(R)-3-methyl-1-(p-methylthio-benzoyloxy)-butyl]-penicillin sodium (A) The preparation of the starting material:

3.19 g. of (R)-α-hydroxy-isocaproic acid and 6.77 ml. of triethylamine were dissolved in 50 ml. of absolute tetrahydrofuran and cooled to —15°. With stirring, a solution of 4.5 g. of 4-methylmercaptobenzoyl chloride in 30 ml. of absolute tetrahydrofuran was added dropwise. The mixture was then stirred at room temperature for 4.5 hours and then concentrated in a vacuum. The residue was dissolved in water, the aqueous solution made acidic with dilute hydrochloric acid and the acid extracted with ethyl acetate. After washing with water, the ethyl acetate extract was dried over sodium sulphate and concentrated in a vacuum. The residue was taken up in high-boiling petroleum ether, a small amount of undissolved material was separated off and the petroleum ether was evaporated in a vacuum. (R) - α - (4-methylmercaptobenzoyloxy)-isocaproic acid was obtained as an oily residue (6.9 g.).

(B) The process:

Starting from (R)-α-(4-methylmercaptobenzoyloxy)-isocaproic acid according to the procedure described in Example 18 there was obtained [(R)-3-methyl-1-(p-methylthiobenzoyloxy)-butyl]-penicillin sodium of melting point 156° (decomposition); $[\alpha]_D^{25}$ +176° (c.=1 in water).

EXAMPLE 39

[(R,S)-1-(p-methylsulfenyl-benzoyloxy)-butyl]-penicillin potassium (A) The preparation of the starting material:

A solution of 28.5 g. of (R,S)-α-bromo-valeric acid t-butyl ester, 26.3 g. of o-methylsulfonylbenzoic acid and 13.3 g. of triethylamine in 200 ml. of absolute dimethylformamide was stirred at 25° for 20 hours and at 100° for 2 hours and subsequently evaporated in a vacuum. The residue was dissolved in a mixture of 500 ml. of ethyl acetate and 250 m. of water. The ethyl acetate phase was washed with ice-cold 5% sodium bicarbonate solution and water, dried over magnesium sulphate and evaporated in a vacuum. The (R,S)-α-(p-methylsulfonylbenzoyloxy)-valeric acid t-butyl ester thus obtained was recrystallized from cyclohexane. Melting point 85°–86°.

A solution of 33.6 g. (R,S)-α-(p-methylsulfonylbenzoyloxy)-valeric acid 6-butyl ester in 50 ml. of anhydrous trifluoroacetic acid was maintained at 25° for 30 minutes and then evaporated in a vacuum. The residue was dissolved in 50 ml. of absolute benzene and the solution evaporated in a vacuum. The (R,S)-α-(p-methylsulfonylbenzoyloxy)-valeric acid thus obtained was recrystallized from benzene. Melting point 118°–120°.

(B) The process:

Starting from (R,S)-α-(p-methylsulfonylbenzoyloxy)-valeric acid according to the procedure described in Example 4 there was obtained [(R,S)-1-(p-methylsulfonylbenzoyloxy-butyl]-penicillin potassium of melting point 130° (decomposition); $[\alpha]_D^{25}$ +172° (c.=1 in water).

EXAMPLE 40

[(R,S)-1-(p-sulfamoyl-benzoyloxy)-pentyl]-penicillin potassium (A) The preparation of the starting material:

A solution of 30.2 g. of (R,S)-α-bromo-caproic acid t-butyl ester, 26.3 g. of p-sulfamoyl benzoic acid and 13.3 g. of triethylamine in 200 ml. of absolute dimethylformamide was stirred at 25° for 20 hours and at 100° for 2 hours and subsequently evaporated to dryness in a vacuum. The residue was dissolved in a mixture of 500 ml. of ethyl acetate and 250 ml. of water. The ethyl acetate phase was washed with ice-cold 5% sodium bicarbonate solution and water, dried over magnesium sulphate and evaporated in a vacuum. The (R,S)-α-(p-sulfamoylbenzoyloxy)-caproic acid t-butyl ester thus obtained was recrystallized from cyclohexane/low-boiling petroleum ether. Melting point 87°–89°.

37.6 g. of (R,S)-α-(p-sulfamoylbenzoyloxy)-caproic acid t-butyl ester were dissolved in 50 ml. of anhydrous trifluoroacetic acid. The solution was maintained at 25° for 30 minutes and then evaporated in a vacuum. The residue was dissolved in 50 ml. of absolute benzene and the solution evaporated to dryness in a vacuum. The (R,S)-α-(p-sulfamoylbenzoyloxy)-caproic acid thus obtained was recrystallized from ethyl acetate/low-boiling petroleum ether. Melting point 118°–124°.

(B) The process:

Starting from (R,S)-α-(p-sulfamoylbenzoyloxy)-caproic acid according to the procedure described in Example 4 there was obtained (R,S)-1-(p-sulfamoylbenzoyloxy)-pentyl]-penicillin potassium of melting point 190° (decomposition); $[\alpha]_D^{25}$ +126° (c.=1 in water).

EXAMPLE 41

[(R,S)-1-(p-sulfamoyl-benzoyloxy)-hexyl]-penicillin potassium (A) The preparation of the starting material:

A solution of 37.1 g. of (R,S)-α-bromo-heptylic acid t-butyl ester, 30.0 g. of p-sulphamoylbenzoic acid and 15.2 g. of triethylamine in 200 ml. of absolute dimethylformamide was stirred at 25° for 18 hours and at 100° for 2 hours and subsequently evaporated in a vacuum. The residue was dissolved in a mixture of 400 ml. of ethyl acetate and 150 ml. of water. The ethyl acetate phase was washed with ice-cold 5% sodium bicarbonate solution and water, dried over magnesium sulphate and evaporated in a vacuum. The (R,S)-α-(p-sulfamoylbenzoyloxy)-heptylic acid t-butyl ester was dissolved in 50 ml. of anhydrous trifluoroacetic acid. The solution was maintained at 25° for 45 minutes and then evaporated in a vacuum. The residue was dissolved in 100 ml. of absolute benzene and the solution evaporated in a vacuum. The (R,S)-α-(p-sulfamoylbenzoyloxy)-heptylic acid thus obtained was recrystallized from benzene. Melting point 133°–135°.

(B) The process:

Starting from (R,S)-α-(p-sulfamoylbenzoyloxy)-heptylic acid according to the procedure described in Example 4 there was obtained [(R,S)-1-(p-sulfamoylbenzoyloxy)-hexyl]-penicillin potassium of melting point 195° (decomposition); $[\alpha]_D^{25}$ +131° (c.=1 in water).

EXAMPLE 42

The following composition was prepared as follows and filled into gelatin capsules.

| Ingredient: | Amount per capsule, mg. |
|---|---|
| [(R) - 1 - (p-chlorobenzoyloxy)-3-methylbutyl]-penicillin sodium | 261.60 |
| Microcrystalline cellulose | 44.15 |
| Starch | 21.25 |
| Talc | 21.00 |
| Magnesium stearate | 2.00 |
| Total | 350.00 |

The penicillin was homogeneously blended with the microcrystalline cellulose and starch and compressed into slugs. The slugs were then passed through a suitable sieving machine and, after blending with the talc and magnesium stearate, filled into suitable gelatin capsules.

EXAMPLE 43

Reconstitutable injectable preparations were prepared as follows. A solution containing 0.8 mg. ethyl p-hydroxybenzoate and 0.1 propyl p-hydroxybenzoate per ml. was prepared by dissolving the substances in boiling hot water for injection. The solution was cooled and 288 g. [(R)-(p-chlorobenzoyloxy)-3-methylbutyl]-penicillin sodium were dissolved in a 1300 ml. portion thereof. The volume was then adjusted to 1500 ml. by addition of the required amount of the solution. The final solution was sterilized by sterile filtration and filled aseptically into 5 ml. ampules, each such ampules receiving 1.5 ml. The solutions were then lyophilized and the ampules hermetically sealed.

What is claimed is:

1. Compounds represented by the formula

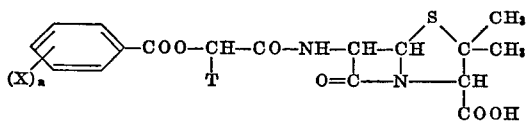

wherein X is hydrogen, halogen, $C_1$-$C_3$ alkyl, $C_1$-$C_3$ alkoxy, $C_1$-$C_3$ alkylthio, ($C_1$-$C_3$ alkanoyloxy)-methyl, ($C_1$-$C_3$ alkoxy)-methyl, $C_1$-$C_3$-alkoxy-acetamido, hydroxy-($C_1$-$C_3$ alkyl), amino-($C_1$-$C_3$ alkyl), di-($C_1$-$C_3$ alkyl)-amino, $C_1$-$C_3$ alkylsulfonamido, $C_1$-$C_3$ alkylsulfonyl, sulfamoyl, carbamoyl, amino, nitro, phenyl, trifluoromethyl, cyano, pyrrol-1-yl or hydroxy or two X symbols on adjacent carbon atoms together are a $C_1$-$C_3$ alkylenedioxy; n is a whole number from 1 to 3 and T is a straight or branched chain $C_2$-$C_5$ alkyl or alkenyl radical, and pharmaceutically acceptable salts and hydrated forms thereof.

2. Compounds in accordance with claim 1 wherein n is 1, X is in the 3 or 4 position and is selected from the group consisting of chlorine, bromine and methoxy.

3. Compound in accordance with claim 1 wherein n is 2, X is in the 3 and 4 position and is selected from the group consisting of chlorine, bromine and methoxy.

4. A compound in accordance with claim 1 wherein n is 1, X is 4-chloro and T is isobutyl, i.e., the compound [(R) - 1 - (4 - chlorobenzoyloxy) - 3 - methylbutyl]-penicillin.

5. A compound in accordance with claim 1 wherein n is 2, each X is chloro and said chloro substituents are in the 3 and 4 positions and T is isobutyl, i.e., the compound [(R) - 1 - (3,4 - dichlorobenzoyloxy) - 3 - methylbutyl]-penicillin.

6. A compound in accordance with claim 1 wherein n is 1, X is 4-chloro and T is isobutyl, i.e., the compound [(R,S) - 1 - (4 - chlorobenzoyloxy) - 3 - methylbutyl]-penicillin.

7. A compound in accordance with claim 1 wherein n is 1, X is 4-fluoro and T is isobutyl, i.e., the compounds [(R,S) - 1 - (4 - fluorobenzoyloxy) - 3 - methylbutyl]-penicillin.

8. A compound in accordance with claim 1 wherein n is 1, X is 4-fluoro and T is isobutyl, i.e., the compound [(R,S) - 1 - (3 - bromobenzoyloxy) - pentyl]-penicillin.

9. A compound in accordance with claim 1 wherein n is 1, X is 2-chloro and T is n-butyl, i.e., the compound [(R,S) - 1 - (2 - chlorobenzoyloxy) - pentyl] - penicillin.

10. A compound in accordance with claim 1 wherein n is 1, X is 4-methoxymethyl and T is isobutyl, i.e., the compound [(R) - 1 - (4 - methoxymethyl-benzoyloxy)-3-methylbutyl]-penicillin.

11. A compound in accordance with claim 1 wherein n is 1, X is 4-acetoxymethyl and T is isobutyl, i.e., the compound [(R) - 1 - (4 - acetoxymethyl - benzoyloxy)-3-methylbutyl]-penicillin.

12. A compound in accordance with claim 1 wherein n is 1, X is 4-phenyl and T is isobutyl, i.e., the compound [(R) - 1 - (4 - phenyl - benzoyloxy) - 3 - methylbutyl]-penicillin.

13. A compound in accordance with claim 1 wherein n is 1, X is 4-methoxy and T is isobutyl, i.e., the compound [(R) - 1 - (4 - anisoyloxy) - 3 - methylbutyl]-penicillin.

14. A compound in accordance with claim 1 wherein n is 3, each X is methoxy and X substituents are in the 3, 4 and 5 positions and T is isobutyl, i.e., the compound [(R) - 1 - (3,4,5 - trimethoxy - benzoyloxy) - 3 - methylbutyl]-penicillin.

15. A compound in accordance with claim 1 wherein n is 1, X is 4-nitro and T is isobutyl), i.e., the compound [(R)-1-(4-nitrobenzoyloxy)-3-methylbutyl]-penicillin.

16. A compound in accordance with claim 1 wherein n is 1, X is 4 - methylthio and T is isobutyl, i.e., the compound [(R) - 1 - (4 - methylthio - benzoyloxy)-3-methylbutyl]-penicillin.

References Cited

UNITED STATES PATENTS

| | | | |
|---|---|---|---|
| 3,301,849 | 1/1967 | Gottstein et al. | 260—239.1 |
| 3,657,224 | 4/1972 | Heuser | 260—239.1 |
| 3,678,032 | 7/1972 | McCaully | 260—239.1 |
| 3,681,342 | 8/1972 | Butler et al. | 260—239.1 |

NICHOLAS S. RIZZO, Primary Examiner

U.S. Cl. X.R.

424—271; 260—471, 473, 470

UNITED STATES PATENT OFFICE
CERTIFICATE OF CORRECTION

Patent No. 3,803,128    Dated April 9, 1974

Inventor(s) Furlenmeier et al.

It is certified that error appears in the above-identified patent and that said Letters Patent are hereby corrected as shown below:

Column 33, line 24 - claim 1 "($C_1$-$C_3$ alkanoyloxy)-methyl,"

should be ($C_1$-$C_4$ alkanoyloxy)-methyl,

Column 34, line 8 - claim 8 "4-fluoro and T is isobutyl,"

should be 4-bromo and T is n-butyl,

Signed and sealed this 19th day of November 1974.

(SEAL)
Attest:

McCOY M. GIBSON JR.
Attesting Officer

C. MARSHALL DANN
Commissioner of Patents